(12) United States Patent
Longdon et al.

(10) Patent No.: US 11,697,898 B2
(45) Date of Patent: Jul. 11, 2023

(54) FABRIC

(71) Applicant: BIOME BIOPLASTICS LIMITED, Southampton (GB)

(72) Inventors: Tony Longdon, Southampton (GB); Paul Robert Mines, Southampton (GB); Daniel Arnillas Perez, Southampton (GB); Maria Begona Gomis Gomis, Southampton (GB); Nydia Badillo Sampedro, Southampton (GB)

(73) Assignee: BIOME BIOPLASTICS LIMITED, Southampton (GB)

( * ) Notice: Subject to any disclaimer, the term of this patent is extended or adjusted under 35 U.S.C. 154(b) by 807 days.

(21) Appl. No.: 16/486,432

(22) PCT Filed: Mar. 9, 2018

(86) PCT No.: PCT/EP2018/055980
§ 371 (c)(1),
(2) Date: Aug. 15, 2019

(87) PCT Pub. No.: WO2018/162751
PCT Pub. Date: Sep. 13, 2018

(65) Prior Publication Data
US 2020/0032437 A1    Jan. 30, 2020

(30) Foreign Application Priority Data

Mar. 10, 2017   (EP) ...................................... 17160454
Mar. 20, 2017   (EP) ...................................... 17161918

(51) Int. Cl.
*D04H 3/011* (2012.01)
*D01F 8/14* (2006.01)
(Continued)

(52) U.S. Cl.
CPC ........... *D04H 3/16* (2013.01); *B65D 85/8046* (2013.01); *B65D 85/8061* (2020.05); *D01D 5/08* (2013.01);
(Continued)

(58) Field of Classification Search
CPC .................................. D01D 5/08; D01D 5/34
See application file for complete search history.

(56) References Cited

U.S. PATENT DOCUMENTS 3,894,827 A      7/1975   Raley et al.
5,458,835 A  *  10/1995   Wilkes .................... A61L 15/28
                                                      264/188
(Continued)

FOREIGN PATENT DOCUMENTS

DE    1166451 B    3/1964
EP    1304201 A1   4/2003
(Continued)

OTHER PUBLICATIONS

Jompang et al., "Poly(lactic acid) and Poly(butylene succinate) Blend Fibers Prepared by Melt Spinning Technique", Energy Procedia, 2013, 34: 493-499.
(Continued)

*Primary Examiner* — Emmanuel S Luk
(74) *Attorney, Agent, or Firm* — James S. Keddie; Bozicevic, Field & Francis LLP

(57) ABSTRACT

A process for producing a thermoformable and bondable fabric in which the fabric is biodegradable and/or compostable. The process comprises extruding a polymeric blend to form a plurality of filaments, the filaments collectively comprising the fabric.

27 Claims, 3 Drawing Sheets

(51) Int. Cl.
- *D01F 6/62* (2006.01)
- *D04H 3/147* (2012.01)
- *D04H 3/16* (2006.01)
- *B65D 85/804* (2006.01)
- *B65D 65/46* (2006.01)
- *D01D 5/34* (2006.01)
- *D01D 5/08* (2006.01)

(52) U.S. Cl.
CPC .............. *D01D 5/34* (2013.01); *D01F 6/625* (2013.01); *D01F 8/14* (2013.01); *D04H 3/011* (2013.01); *D04H 3/147* (2013.01)

(56) References Cited

U.S. PATENT DOCUMENTS

| | | | |
|---|---|---|---|
| 5,698,322 A | 12/1997 | Tsai et al. | |
| 5,985,776 A | 11/1999 | Bertrand et al. | |
| 6,072,158 A | 6/2000 | McNally | |
| 6,787,493 B1 | 9/2004 | Nagaoka et al. | |
| 9,091,004 B2* | 7/2015 | He | D04H 1/56 |
| 9,200,392 B2* | 12/2015 | Matsubara | B32B 5/022 |
| 9,212,432 B2* | 12/2015 | Ferry | D04H 3/16 |
| 9,902,897 B2* | 2/2018 | Takahashi | D01F 6/92 |
| 10,589,884 B2* | 3/2020 | Woodward | B29C 51/08 |
| 2004/0265579 A1* | 12/2004 | Dugan | D01F 8/14 428/364 |
| 2005/0014871 A1* | 1/2005 | Chin | C08K 5/34 524/99 |
| 2008/0042312 A1 | 2/2008 | Chen et al. | |
| 2008/0057309 A1 | 3/2008 | Liu et al. | |
| 2008/0081090 A1 | 4/2008 | Mayr et al. | |
| 2008/0104738 A1* | 5/2008 | Conley | D01D 5/0084 2/82 |
| 2010/0048082 A1 | 2/2010 | Topolkaraev et al. | |
| 2010/0092687 A1* | 4/2010 | Sumida | D01D 5/0061 137/15.04 |
| 2010/0130084 A1* | 5/2010 | Matsubara | D04H 3/018 442/352 |
| 2010/0144533 A1* | 6/2010 | Baier | A01N 43/90 264/129 |
| 2011/0185911 A1 | 8/2011 | Rapparini | |
| 2011/0232188 A1* | 9/2011 | Kennedy | A01G 24/44 264/118 |
| 2012/0097602 A1 | 4/2012 | Tedford | |
| 2012/0289658 A1* | 11/2012 | McEneany | D01F 6/92 525/190 |
| 2013/0030340 A1* | 1/2013 | Vincent | D04H 1/43828 442/164 |
| 2013/0263384 A1* | 10/2013 | Harada | D06M 13/1845 8/115.52 |
| 2014/0127364 A1 | 5/2014 | Fu et al. | |
| 2014/0242309 A1 | 8/2014 | Foss et al. | |
| 2014/0272362 A1* | 9/2014 | Dugan | D04H 1/5418 442/361 |
| 2014/0336700 A1* | 11/2014 | Dave | D01F 1/10 606/213 |
| 2016/0115630 A1* | 4/2016 | Kubota | D01F 8/14 428/370 |
| 2016/0312384 A1* | 10/2016 | Goretzki | D04H 3/02 |
| 2016/0328675 A1* | 11/2016 | Busby | A24D 3/02 |
| 2017/0027774 A1* | 2/2017 | Ashraf | A61F 13/15658 |
| 2017/0066188 A1* | 3/2017 | Luo | B33Y 70/00 |
| 2018/0038026 A1* | 2/2018 | Drews | D01D 5/08 |
| 2018/0282926 A1* | 10/2018 | Frey | D01D 5/0985 |

FOREIGN PATENT DOCUMENTS

| | | |
|---|---|---|
| EP | 1553224 A1 | 7/2005 |
| EP | 1985267 A1 | 10/2008 |
| JP | H11342078 A | 12/1999 |
| JP | 3701539 B2 | 9/2005 |
| JP | 2012130575 A | 7/2012 |
| JP | 5486332 B2 | 5/2014 |
| JP | 2014218766 A | 11/2014 |
| WO | WO 98/24951 A1 | 6/1998 |
| WO | WO 99/23163 A1 | 5/1999 |
| WO | WO 2009/145778 A1 | 12/2009 |
| WO | WO 2011/077091 A1 | 6/2011 |
| WO | WO 2011/124989 A2 | 10/2011 |
| WO | WO 2012/027539 A2 | 3/2012 |
| WO | WO 2013/157924 A1 | 10/2013 |
| WO | WO 2013/165832 A1 | 11/2013 |
| WO | WO 2013/189555 A1 | 12/2013 |
| WO | WO 2014/138898 A1 | 9/2014 |
| WO | WO 2015/087798 A1 | 6/2015 |
| WO | WO 2015/128527 A1 | 9/2015 |
| WO | WO 2016/067128 A1 | 5/2016 |
| WO | WO 2017/106191 A1 | 6/2017 |
| WO | WO 2018/070490 A1 | 4/2018 |

OTHER PUBLICATIONS

Bhatia et al., "Compatibility of Biodegradable Poly (lactic acid) (PLA) and Poly (butylene succinate) (PBS) Blends for Packaging Application", Korea-Australia Rheology Journal, 2007, 19(3): 125-131.

Biostrength 280, Transparent Impact Modifier, Product Description, Arkema, 2017.

Sheth et al., "Biodegradable Polymer Blends of Poly (lactic acid) and Poly (ethylene glycol)", Journal of Applied Polymer Science, 1997, 66: 1495-1505.

* cited by examiner

FABRIC

CROSS-REFERENCE TO RELATED APPLICATIONS

This application is a § 371 national phase of International Application No. PCT/EP2018/055980, filed on Mar. 9, 2018, which claims the benefit of European Patent Application No. 17160454.9, filed on Mar. 10, 2017, and European Patent Application No. 17161918.2, filed on Mar. 20, 2017, which applications are incorporated by reference herein.

The present invention relates to processes for the production of fabrics, products comprising such fabrics, and blends. The products of the present invention have particular, but not exclusive, utility in filtration applications (such as coffee brewing).

Filters are useful in a wide variety of applications, from solid-gas mixture separation (for example in air conditioning applications), to solid-liquid separation (for example in coffee brewing applications). Filters may take the form of non-woven fabrics comprising polymeric filaments.

For a given application, filters may be required to have specific properties. In coffee filtration applications (also known as "coffee brewing"), for example, filters must possess requisite properties in terms of resistance to water at elevated temperature, which is often delivered in conjunction with elevated pressure.

Typically, a coffee filter may be part of a composite article, such as a coffee pod comprising a single measure of coffee for brewing in a coffee brewing machine. In such composite articles, the filter must be bonded to one or more of the other article components. Therefore filters, must possess requisite properties in terms of bondability as well.

Filters are often manufactured using thermoforming steps to yield filters having specific shapes. Thus, fabrics for use in such applications should also possess requisite properties in terms of thermoformability. This typically requires a balance between a fabric being sufficiently pliable when heated to enable shaping, while remaining sufficiently strong to avoid breaking apart.

There exists a general demand for materials to be biodegradable and/or compostable, particularly for disposable products. However, it has hitherto been difficult to manufacture polymeric materials having properties suitable for use in filtration applications which possess sufficient biodegradability and compostability properties.

It is desirable to provide an improved manufacturing technique and/or improved product, and/or otherwise to obviate and/or mitigate one or more of the disadvantages with known and/or techniques and/or polymeric materials, whether identified herein or otherwise.

The term "thermoformable" is intended mean having the ability to be shaped using heat and pressure. Thermoforming a polymeric material may involve raising the material to a temperature above its glass transition temperature. The temperature may be below the melting point of the material.

The term "capable of bonding" and/or "bondable" is intended mean having the ability to be joined to a solid article (e.g. by heat bonding, welding, adhering, etc.).

The term "solid article" as used herein is given a broad definition, and may be interpreted as a tool, container, implement, instrument, device, apparatus, gadget, appliance, machine, contraption, mechanism, aid, or the like. The solid article may be a coffee pod. Coffee pods may be understood to be containers providing one or more measures of coffee (e.g. in the form of powder, granules, or the like; one "measure" being usable to produce a single serving of a coffee beverage from the coffee pod) for brewing in a suitable coffee machine.

The term "non-woven fabric" as used herein, may be understood to mean a sheet or web structure. The structure may be bonded together by entangling filaments (e.g. by mechanical entanglement, fluid entanglement, etc), thermally bonding, and/or chemically bonding.

The term "biodegradable" as used herein, means degradable by means of microorganisms, such as fungi, bacteria, viruses, algae, etc.; and/or by exposure to enzymatic mechanisms. As applied to a given article, such as a fabric, the requirement "biodegradable" should be understood to be met if the majority of that article is biodegradable, i.e. if the article is "partially" biodegradable. It is not intended that the entire article must be biodegradable. Suitably, at least 60% of the article may be biodegradable, on a weight basis; optionally at least 70%; optionally at least 80%; optionally at least 90%; optionally at least 95%; optionally 100% of the article may be biodegradable. Generally speaking, greater biodegradability is preferred.

The term "compostable" means degradable to form compost. As applied to a given article, such as a fabric, the requirement "compostable" should be understood to be met if the majority of that article is compostable, i.e. if the article is "partially" compostable. It is not intended that the entire article must be compostable. Suitably, at least 60% of the article may be compostable, on a weight basis; optionally at least 70%; optionally at least 80%; optionally at least 90%; optionally at least 95%; optionally 100% of the article may be compostable. Generally speaking, greater compostability is preferred.

The term "resistant to temperatures", as applied to a particular value or range, should be interpreted as implying that the relevant component may be resistant to thermal deformation, distortion, deflection and/or degradation when exposed to a given temperature, particularly when also subjected to a load (e.g. pressure).

The term "resistant to pressure", as applied to a particular value or range, should be interpreted as implying that the relevant component is resistant to deformation, distortion, deflection and/or degradation (e.g. breaking apart, disintegrating, splintering, fracturing, rupturing, etc), when exposed to such pressures, particularly when subjected to elevated temperatures as well, sequentially or simultaneously (as described above). Such pressures may onset rapidly, e.g. via exposure to a pressurised liquid, such as during coffee brewing. Therefore the fabrics may be resistant to rapid onset (e.g. over a period of about one second) of such temperatures as well.

The term "glass transition temperature", as applied to a mixed component comprising a polymer (such as a blend, a fabric comprising a blend, etc.), should be understood to denote the relevant transition temperature of the predominant polymer in the blend (i.e. major component on a weight basis). In instances where polymers in a blend are fully dispersible (e.g. miscible) in one another, then the glass transition of the blend may comprise properties combined from each of the polymers.

As used herein, if a processing feature is described as being "downstream" of another processing feature, then it should be understood that the relevant downstream processing feature occurs later, on a temporal basis, in the defined process. Similarly, if a processing feature is described as being "upstream" of another processing feature, then it should be understood that the relevant upstream processing feature occurs earlier, on a temporal basis, in the defined process.

As used herein, the term "planar isotropy" is intended to refer to a material having uniform filament distribution in all directions/orientations in a plane (e.g. the two-dimensional plane of a fabric). Typically, filaments in non-woven materials (e.g. those produced by extrusion processes) possess greater alignment along a machine direction.

As used herein, the term "substantially" is intended to modify a quality such that a given feature need not be "exactly" in accordance with that quality. Suitably, this modifier may indicate a deviation from the quality given of less than or equal to about 20%, such as less than or equal to about 15%, such as less than or equal to about 10%, such as less than or equal to about 5%, such as less than or equal to about 1%, such as about 0%. Generally speaking, lower deviation is preferred. By way of example, if something is "substantially isotropic", this may be interpreted as also referring to a material having less than or equal to about 20% deviation from complete planar isotropy, for example.

According to the present invention there is provided a process for producing a thermoformable and bondable fabric, the fabric being biodegradable and/or compostable, the process comprising:

extruding a polymeric blend to form a plurality of filaments, the filaments collectively comprising the fabric.

The present invention provides teaching to enable fabrics to be obtained which are formed from polymeric blends which are biodegradable and/or compostable, which have properties suitable for thermoforming, and which are capable of bonding to a solid article. The present invention provides, in particular, teaching to enable production of fabrics that are able to be thermoformed into suitably-shaped filters for use in, for example, coffee brewing applications (such as coffee pods comprising said filters). It has been found that a number of parameters and other factors should be considered and adjusted when producing such fabrics/filters and these are set out in detail below. A combination of factors may be required to yield suitable fabrics/filters.

Thermoforming is a general term to denote the shaping of a material by means of a heating process using force to deform a material and thereby achieve a desired shape. During thermoforming, a material may undergo changes in various material properties. The processing conditions of the invention are useful for enabling the production of fabrics which have properties suitable for use in such thermoforming processes.

The fabrics of the invention are manufactured using an extrusion technique. Conventional extrusion techniques may involve passing a molten material through small diameter orifices in a die. The molten material may form liquid jets of material upon exiting the orifices. The jets may thereafter be cooled, causing the molten material to solidify and thereby form solid filaments of the material, the filaments corresponding to the jets. The filaments can then be collected together to form the fabric.

Extrusion may be conducted at a temperature of about 200° C. to 250° C.; optionally about 210° C. to 240° C.; optionally about 220° C. to 250° C.; optionally about 230° C. to 250° C. Extrusion may be conducted at a pressure of about 50 to 300 bar; optionally about 50 to 200 bar; optionally about 50 to 175 bar.

The process may comprise spunbonding, comprising a die (e.g. a spinneret). Spunbonding is a specific type of extrusion in which the liquid jets of material are exposed to a quenching fluid upon exiting the die (e.g. air at a temperature sufficient to solidify the material). The quenching fluid may be configured to cause the jets to solidify as a continuous filament leaving the die. Quenching may be achieved in a chamber (known as a "spinning chamber") to assist in maintaining ambient conditions (e.g. temperature and/or pressure around the die orifices). The spinning chamber may have a length (in the machine direction, through which filaments traverse upon leaving the orifices) of about 1 m to 1.5 m, width of about 1.3 m, depth of about 0.45 m and a downstream outlet gap of about 80 mm. The spinning chamber may have a first zone (i.e. which filaments encounter first upon traversing the spinning chamber) in which quenching air is provided at a temperature of about 20° C. to 40° C. and a second zone in which quenching air is provided at a temperature of about 15° C. to 30° C.

The jets and downstream filaments leaving the die may be moved away from the orifices (e.g. by a conveyer belt and/or one or more rollers) for downstream processing.

Spunbonding can be a difficult technique to operate and/or optimise, since disruption of any one of the jets/filaments of material exiting the die (i.e. breaking the continuity of the jet/filament) may cause the resultant filament to break. Since the filaments are pulled away from jets leaving the die, filament breakage means that the pulling force can no longer be transmitted along the filament and into the jet. The pulling force also guides filaments/jets leaving the die, and so breakage also means that such guidance is lost. Collectively, these factors may result in an unguided filament impacting other filaments/jets as it leaves the die. Since the filament/jet is at a high temperature (above the melting point of the material in the jet), an impacting filament/jet can bond with other filaments/jets, thereby further affecting the extrusion process. Typically, it is necessary to terminate the process if a small number (such as about five) of filaments are broken (noting that a spun bonding die may have thousands of orifices and thereby generate thousands of filaments).

The spunbonding die may have an orifice density of at least about 1000 orifices per metre of width; optionally at least about 1500 orifices per metre of width; optionally at least about 2000 orifices per metre of width; optionally at least about 4000 orifices per metre of width; optionally at least about 6000 orifices per metre of width; optionally at least about 6800 orifices per metre of width. The number of orifices in a die dictates the number of filaments produced and thereby influences the filament count (i.e. the thread count) in the resultant fabric.

The spunbonding die may have an orifice density of up to about 10,000 orifices per metre of width; optionally up to about 9000 orifices per metre of width; optionally up to about 8000 orifices per metre of width; optionally up to about 5000 orifices per metre of width; optionally up to about 4000 orifices per metre of width; optionally up to about 3000 orifices per metre of width.

The spunbonding die may have an orifice density of between about 1,500 and about 3,500 orifices per metre of width; such as about 2,000 to about 3,000; such as about 2,250 to about 2,750 orifices per metre of width.

The orifices may be provided as an array, with multiple rows of orifices. By way of example, if the die has an orifice density of 2000 orifices per metre of width, and is provided as an array with five rows of orifices, then the die may have five rows of 400 orifices in total.

The process may comprise drawing (or "elongating") the filaments; wherein said filaments are at a temperature at or above a glass transition temperature during said drawing. The filaments may be below a melting temperature during said drawing.

When the filament is at a temperature above the glass transition temperature, applying a force (i.e. a tensile force) to the material may cause individual polymer strands to align. Drawing in this way increases the crystallinity of the polymeric material. In the extrusion techniques of the present invention, particularly with reference to spunbonding techniques, the force can be tuned (i.e. selectively adjusted) to draw the materials by a desired amount, with consequential effects on crystallinity as described above.

The filaments may be exposed to an extrusion cabin pressure of about 1000 to about 5000 Pa during the process, such as about 2000 to about 5000 Pa during the process, such as about 2250 to about 4500 Pa, such as about 2500 to about 4000 Pa. Such pressures may be employed in a spunbonding process.

Cabin pressure affects the air flow in an extrusion process, such as the spinning chamber in a spunbond process. This affects the drag forces to which filaments are exposed and therefore influences the draw and crystallinity as explained above. Higher cabin pressures may cause higher draw.

The process may be configured to yield a crystallinity in the plurality of filaments of about 30 to about 45%, such as about 32 to about 45%, such as about 34 to about 43%, such as about 36 to about 43%, such as about 38 to about 41%, such as about 39%.

Spunbonding processes may be configured to produce filaments with such crystallinity. The crystallinity may be considered as an average crystallinity (e.g. an average across all filaments in a fabric).

The glass transition temperature, crystallisation temperature and melting temperature can be determined by Differential Scanning calorimetry (DSC), Differential Thermal Analysis (DTA), Dynamic Thermo-Mechanical Analysis (DTMA) or Thermo-Mechanical Analysis (TMA) using methods and apparatus known to the skilled person. The glass transition temperature of the material may be measured using ASTM D3418-15 and/or ISO 11357-2:2013.

The degree of crystallisation can also be established by DSC. The DSC spectra for a semi-crystalline material (i.e. a material that is not completely crystalline) that has low crystallinity will typically have three types of thermal transition. These are (i) a step change in the energy flow at the glass transition temperature ($T_g$) of the material, which can be due to a change in the heat capacity of the material; (ii) an exothermic region at the crystallisation temperature ($T_c$) of the material; and (iii) an endothermic region at the melting point ($T_m$) of the polymer.

A number of processing features discussed herein (e.g. the drawing stage) result in an increase in the crystallinity of the material. The increase in crystallinity can result in a reduction or removal of the exothermic crystallisation peak in the DSC spectra, depending on the extent of increase in crystallinity. A decrease in the magnitude of the exothermic crystallisation peak is therefore an indication of the extent of increase in material crystallinity.

A polymer (e.g. PLA) having a higher degree of crystallinity, as compared with the same polymer having a lower degree of crystallinity, will typically have better heat and/or pressure resistance and/or may undergo reduced shrinkage (e.g. during thermoforming and/or when exposed to hot liquid). As a result, processing steps resulting in a higher degree of crystallinity may be advantageous for applications in which resistance to heat and/or resistance to shrinkage is required.

A polymer (e.g. PLA) having a higher degree of crystallinity, as compared with the same polymer having a lower degree of crystallinity, will typically be more brittle. As a result, it should be understood that the heat resistance and/or shrinkage improvement as a result of processing steps resulting in greater crystallinity should be balanced against the required mechanical and thermoformability properties of the material.

The filaments may be at a temperature in the range of about of 60° C. to 150° C. during said drawing, optionally about 75° C. to 125° C., optionally about 90° C. to 120° C., optionally about 90° C. to 110° C.; optionally about of 75° C. to 125° C., optionally about 90° C. to 120° C., optionally about 90° C. to 110° C.

Upon exiting the extrusion die, the material undergoes a transition from molten liquid into a solid filament. When extruding polymeric materials, the liquid material transitions from liquid to solid via a glass transition, in which the material is in the form of a viscous solid material. The point of glass transition is dictated by temperature, with different materials undergoing glass transitions at different temperature ranges depending on the components in the material.

Drawing may be achieved by any component suitable for elongating the filaments (such as an elongation means or an elongator). Such a component may provide an elongating flow of fluid (such as a gas, e.g. air), or may take the form of elongating rollers, or the like.

The process may comprise melt blowing. Melt blowing is an alternative type of extrusion to spun bonding. In melt blowing, liquid jets of material are exposed to a high velocity gas flow upon exiting the die. The gas flow intentionally disrupts the liquid jet to separate sections of the jet from one another, with the result that the filaments solidifying therefrom are short and may be discontinuous. The solidified filaments are blown by the gas onto a collecting surface, e.g. a conveyer belt.

The melt blowing die may have an orifice density of at least about 8 holes per cm of die width (20 holes per inch of die width, e.g. with holes of about 0.6 mm diameter); optionally 14 holes per cm of die width (35 holes per inch of die width, e.g. with holes of about 0.4 mm diameter); optionally 18 holes per cm of die width (45 holes per inch of die width; e.g. with holes of about 0.3 mm diameter). The orifices in the melt blowing die may be in a single linear row.

The gas flow (e.g. an air knife) may be at a temperature of greater than about 150° C., optionally greater than about 200° C., optionally greater than about 250° C.; optionally up to about 350° C., optionally up to about 300° C. The gas flow (e.g. an air knife) may be at a pressure of greater than about 0.05 bar, optionally greater than about 0.075 bar, optionally greater than about 0.1 bar; optionally up to about 0.5 bar, optionally up to about 0.25 bar. The gas flow (e.g. an air knife) may have a flow rate of greater than about 500 L/min, optionally greater than about 750 L/min, optionally greater than about 1000 L/min; optionally up to about 3000 L/min, optionally up to about 2000 L/min, optionally up to about 1500 L/min.

A flow of fluid (e.g. a gas, such as air) may be provided downstream of the die, said flow of gas being configured to disperse filaments in all directions to thereby to increase planar isotropy of filament orientation. The flow of gas may be turbulent, such as a vortex.

It will be understood that fabrics are typically comprised of an interconnected network of filaments, each of those filaments having an orientation with respect to an arbitrary reference direction on the bulk fabric. When a tensile (pulling) force is applied to the fabric, filaments which are not aligned with the direction of the tensile force may be caused to re-orient themselves along said direction and thereby enable the fabric to become somewhat elongated (e.g. stretched) along that direction. Such straightening can be permanent, causing the shape of the fabric to be permanently changed upon application and subsequent release of the tensile force. Alternatively, the fabric may revert (partially or completely) towards its original shape (i.e. its shape before the tensile force was applied) upon release of the tensile force.

The fluid configured disperse filaments may be below the glass transition temperature of the filament; optionally the fluid may be at a temperature of about 10 to 50° C.; optionally about 15 to 40° C.

Tensile properties of the material may be measured using ISO 9073-3:1989. Testing of a material exposed to fluid configured to increase planar isotropy of filament orientation and comparison against a material in the absence of such a fluid may be used to understand the increase in this regard.

The fabric may have an isotropic ratio (tensile) of about 0.5 to about 2, such as about 0.8 to about 1.5, such as about 0.8 to about 1.2 or about 1 to about 1.5. Isotropic ratio may be defined as the tensile strength in a machine direction divided by the tensile strength in a transverse direction.

The process may further comprise calendering, optionally at a temperature of about 90° C. to 130° C. and/or at a temperature of about 50 N/mm width to 120 N/mm width; and/or entanglement, optionally by mechanical entanglement (e.g. needling) or fluid-entanglement (e.g. hydro-entanglement or air-entanglement).

The process may comprise mechanical entanglement or fluid-entanglement (such as gaseous entanglement, optionally air entanglement; or liquid entanglement such as hydro-entanglement). Fabrics produced from a process comprising mechanical entanglement or fluid-entanglement comprise filaments that may be able to move more readily than if thermally bonded (e.g. by calendering). Moreover, such processes may improve filament orientation through the fabric (e.g. in a thickness/depth direction). Fabrics produced from processes comprising mechanical entanglement or fluid-entanglement have improved thermoforming properties.

The process may comprise hydro-entanglement. It has been found that hydro-entanglement offers processing benefits and produces fabrics with particularly suitable properties for the present invention. Hydro-entanglement may employ one or more water jets. Said one or more water jets may be configured to project water at a pressure of about 7,000 to about 12,500 kPa, such as about 7,500 to about 12,000 kPa, such as about 8,000 to about 11,500 kPa, such as about 8,500 to about 11,000 kPa.

The pressure adopted has an impact on the degree of entanglement achieved in the resultant fabric. If water pressure is too low, then the fabric may be too loose and/or there gaps may form in the fabric during thermoforming. If the pressure is too high, then the fabric may be excessively bonded and this can negatively impact thermoforming, since the fabric may not have sufficient ability to stretch.

In the event there are multiple jets, these may be independently configured to project water at different rates. By way of example, one jet (or set of jets) may project water at a pressure of about 8,500 to about 11,000 kPa, while another jet (or set of jets) may project water at a pressure of about 10,000 kPa to about 11,000 kPa.

The process may further comprise an infrared heating step downstream of said hydro-entanglement. Such a step may be useful to dry fabrics following hydro-entanglement. Such a step may provide initial, partial drying and may be followed by further heating/drying (e.g. in a hot-air oven). It has been found that use of an infrared heating step leads to fabrics with better shrink resistance properties.

Without wishing to be bound by theory, it is believed that infrared heating causes rapid heating of water in the fabric and consequent generation of localised steam. It is believed that said steam has the effect of heat setting the fabric, thereby improving dimensional stability.

The process may further comprise laying the filaments onto a surface. Laying may be used to enable consolidation of the filaments into a fabric. The filaments may be at a temperature above a glass transition temperature during said laying (e.g. in melt blowing processes). Laying the filaments in this way enables point bonding to occur between filaments that contact one another (point bonding referring to a bond forming at the point of contact). This further enables consolidation of the filaments into a bonded fabric. The filaments may be below a melting temperature during said laying.

The filaments may be at a temperature in the range of about 60° C. to 150° C., optionally about 75° C. to 125° C. during said laying, optionally about 90° C. to 120° C., optionally about 90° C. to 110° C.

Filaments may be consolidated using a heated roller (e.g. at a temperature of about 50° C. to about 90° C., such as about 70° C. or more) configured to compress the filaments (e.g. with a force of about 1 bar to 3 bar; such as about 2 bar or more).

Suction may be applied in an area of the orifices and externally of the die, said suction being configured for removing fumes (i.e. volatile components) evolved during said extrusion (e.g. in the form of a vacuum). Fumes evolved during extrusion can disrupt filament formation, and may accumulate around the orifices in the die.

The process may comprise forming the fabric to a desired shape (such as a substantially prolate hemispherical dome). Forming may be achieved by thermoforming (e.g. using a thermoforming mold). The thermoforming mold may be at a temperature of about 70° C. to 140° C. The thermoforming mold may suitably be at a temperature of about 70° C. to 110° C., such as about 60° C. to 100° C. in melt blowing processes. The thermoforming mold may suitably be at a temperature of about 110° C. to 155° C., such as about 110° C. to 120° C. or 120° C. to 140° C. in spun bonding processes.

The fabric may be at a defined temperature above the glass transition temperature during said forming. As discussed above in relation to drawing the filaments, applying a force to the material may cause individual polymer chains to align. Thermoforming in this way increases the crystallinity of the polymeric material, while also achieving a desired shape. In the extrusion techniques of the present invention, particularly with reference to spunbonding techniques, the force can be tuned (i.e. selectively adjusted) to thermoform the materials by a desired amount, with consequential effects on crystallinity, and factors for consideration, as described above. The filaments may be below a melting temperature during said thermoforming.

The fabric may be at a defined temperature of about 60° C. to 150° C.; optionally about 75° C. to 125° C. during said forming, optionally about 90° C. to 120° C., optionally about 90° C. to 110° C.; optionally about 75° C. to 125° C., optionally about 90° C. to 120° C., optionally about 90° C. to 110° C.

The defined temperature may be achieved by directing a flow of gas (e.g. air) at the fabric; optionally wherein the gas is at a temperature in the range of about 75° C. to 170° C., optionally about 90° C. to 155° C., optionally about 140° C.

to 150° C. The defined temperature may be about 75° C. to 140° C.; optionally 90° C. to 130° C.; optionally 90° C. to 120° C. The flow of gas may be uniformly applied to an area of the fabric on which forming occurs.

The blend may comprise (a) polylactic acid and (b) polybutylenesuccinate, polybutylene succinate-co-adipate, polybutylene adipate-co-terephthalate, polyhydroxyalkanoate (e.g. polyhydroxy butyrate co-hexanoate or polyhydroxy butyrate co-valerate, such as poly(3-hydroxybutyrate-co-3-hydroxyvalerate)) and/or polycaprolactone.

(a) may be present at an amount of about 98% to 2% and (b) is present at an amount of about 2% to 98%, based on the total weight of the blend; optionally wherein (a) is present at an amount of about 97% to 3% and (b) is present at an amount of about 3% to 97%; optionally wherein (a) is present at an amount of about 95% to 5% and (b) is present at an amount of about 5% to 95%; optionally wherein (a) is present at an amount of about 93% to 7% and (b) is present at an amount of about 3% to 97%; optionally wherein (a) is present at an amount of about 90% to 10% and (b) is present at an amount of about 10% to 90%.

Polylactic acid exists as two different stereoisomers referred to as "D" and "L". A given blend may have a defined stereoisomeric ratio of polylactic acid units (i.e. a ratio of units having the D or L configuration). The D-content and L-content may be measured by fully hydrolysing the polymer chain to fully break up the lactic acid units (e.g. with sodium hydroxide) and then determining the D-lactide content in accordance with the procedure set out in 'Determination of D-lactide content in lactide stereoisomeric mixture using gas chromatography-polarimetry', Feng et al., Talanta 164 (2017) 268-274, as measured at room temperature (20° C.) in 1.0% w/v solution, 589 nm, 100 mm cell dichloromethane solvent.

The process may comprise one or two of said polymeric blends, wherein the one or two polymeric blends collectively comprise:
(a) a first polylactic acid; and
(b) a second polylactic acid,
wherein the first polylactic acid (a) comprises a greater proportion of D-configuration lactic acid units to L-configuration lactic acid units than in the second polylactic acid (b).

The process may be one in which:
(a) the first polylactic acid comprises up to about 5% D-configured lactic acid units (based on the total number of lactic acid units in the polylactic acid), such as about 1 to about 5%, such as about 3 to about 5% D-configured lactic acid units, such as about 3.5% to about 4.5% D-configured lactic acid units, such as about 4% D-configured lactic acid units; and/or
(b) the second polylactic acid comprises up to about 1% D-configured lactic acid units (based on the total number of lactic acid units in the polylactic acid), such as about 0.1 to about 1% D-configured lactic acid units, such as about 0.25 to about 0.75% D-configured lactic acid units, such as about 0.5% D-configured lactic acid units.

The first polylactic acid (a) may have a lower melting point than the second polylactic acid (b).

The process may employ one polymeric blend, comprising about 5 to about 15% of the first polylactic acid (a) and about 78 to about 88% of the second polylactic acid (b), based on the total weight of the blend); optionally about 8 to about 12% (a) and about 81 to about 85% (b); optionally about 9 to about 11% (a) and about 82 to about 84% (b); optionally about 10% (a) and about 83% (b). It has been found that filaments comprising a minor amount of a polylactic acid having a lower melting point (e.g. a polylactic acid having a higher D content) can improve thermoformability.

Extrusion may be configured to produce filaments having a shaped or engineered transverse cross section (e.g. filaments having a bi-component configuration), for example, an islands-in-the-sea, core-sheath, or segmented pie configuration.

The process may be configured to yield filaments having a bi-component filament (such as a core and sheath configuration), wherein there is one polymeric blend and both components comprise the same polymeric blend.

The process may be configured to yield filaments having a bi-component filament (such as a core and sheath configuration), wherein there are two polymeric blends and each component comprises a different polymeric blend. Bi-component filaments, such as core-sheath filaments, are able to utilise a polymeric blend having certain properties for the core (such as a blend with high tensile strength), with different properties for the sheath (such as a low glass transition and/or softening temperature, facilitating point bonding as set out above), resulting in the filament as a whole having combined properties not achievable with a single blend.

The process may be configured to yield filaments having a bi-component filament (such as a core and sheath configuration), wherein one component comprises a polymeric blend comprising said second polylactic acid (b) and wherein the other component comprises polymeric blend comprising said first polylactic acid (a).

The process may be configured to yield filaments having a core and sheath configuration, wherein the core comprises a polymeric blend comprising said second polylactic acid (b) and wherein the sheath comprises a polymeric blend comprising said first polylactic acid (a).

The process may be configured to yield a filament having a core comprising about 60 to about 90% of a filament, on a weight basis, such as about 70 to about 90% of a filament, such as about 75 to about 85%, optionally about 80% of a filament.

The blend may comprise polybutylenesuccinate. It has been found that the presence of polybutylenesuccinate can improve fabric properties, particularly thermoformability and/or shrinkage control.

Polybutylenesuccinate may be present at an amount of about 3 to about 12%, such as about 5 to about 11%, such as about 5 to about 10%, such as about 6 to about 8%, optionally about 7%, based on the total weight of the blend. Polybutylenesuccinate may be used in the core-sheath filaments discussed above, particularly with the above-described core-sheath filaments having a sheath comprising a polymeric blend having a greater proportion of D-configuration polylactic acid molecules than the blend comprising the core.

It will be appreciated that if there is, for example, 5% polybutylenesuccinate in the blend, then the blend may comprise one or more further components listed under option (b) above at an amount sufficient to bring the total amount of polybutylenesuccinate and said further components to within the ranges for (b) noted above. By way of example, if (b) is present at an amount of 20% and there is 5% polybutylenesuccinate present in the blend, then there must be 15% of one or more further components listed under option (b) above present in the blend.

The blend may comprise an antioxidant. The blend of the invention may be subject to high temperatures, e.g. during thermoforming and/or extrusion. Addition of an antioxidant may prevent degradation (oxidation) of the blend when at elevated temperatures.

The antioxidant may be present at up to about 2 wt %, based on the total weight of the blend. The specific antioxidant may be selected to reduce and/or prevent oxidation at an extrusion temperature. The specific antioxidant may be selected to reduce and/or prevent oxidation at a temperature of at least about 200° C., optionally at least about 210° C.; optionally at least about 220° C.; optionally at least about 230° C.; optionally at least about 240° C. The antioxidant may be Sukano PBS aoS723 (previously named TA-45-08 MB) 13 as commercially available from Sukano.

The blend may further comprise a further polymer selected from polybutylene adipate-co-terephthalate, polycaprolactone or a polyhydroxyalkanoate (e.g. polyhydroxy butyrate co-hexanoate or polyhydroxy butyrate co-valerate, such as poly(3-hydroxybutyrate-co-3-hydroxyvalerate). The further polymer may be present at a level up to about 10 wt %, based on the total weight of the blend; optionally about 5 to 10%; optionally about 10%.

The process may employ a diffuser exit gap of between about 100 to 150 mm, such as about 105 to 145 mm, such as about 111 to 142 mm.

The process may employ a line speed of about 15 to 50 metres per minute, such as about 20 to about 45 metres per minute, such as about 25 to about 40 metres per minute.

The process may employ a presser roller (e.g. upstream of an entangler) configured to press the fabric with a pressure of at least about 100 kPa, such as at least about 200 kPa, such as at least about 300 kPa. The presser roller may be configured to press the fabric with a pressure of between about 100 kPa and about 400 kPa, such as about 200 kPa to about 300 kPa. The presser roller may be heated to a temperature of about 40 to about 80° C., such as a temperature of about 50 to about 70° C.

In the process, liquid jets of material leaving a spundbonding die may be exposed to quenching air upon exiting the die. This causes the jets to solidify as continuous filaments leaving the die. The spinning chamber may have an upper zone (i.e. which filaments encounter first upon traversing the spinning chamber, e.g. generally comprising the upper third of the spinning chamber) in which said quenching air is provided. As the filaments traverse the chamber into the lower zone (e.g. comprising the bottom two thirds of the chamber) the jets may be exposed to a flow of drawing air to draw the filaments. The ratio of air flow between the quenching air and the drawing air is known as the air volume ratio. The process may employ an air volume ratio (quenching to drawing) of about 3 to about 7.5, such as about 3.5 to 7, such as about 3.9 to about 6.6.

Various features set out above may be combined in the process of the present invention. The process may comprise a spunbond process for producing filaments from a blend comprising polybutylenesuccinate at a defined amount, the process may adopt a defined cabin pressure and be configured to produce filaments having a defined crystallinity, the process may comprise mechanical entanglement or hydro-entanglement (optionally hydro-entanglement).

A second aspect of the present invention provides a biodegradable and/or compostable fabric comprising filaments of a polymeric blend, said fabric being thermoformable and capable of bonding to a solid article.

Said fabric may be obtainable or obtained by the process according to the first aspect above.

Said filaments may have a crystallinity of about 30 to about 45%, such as about 32 to about 45%, such as about 34 to about 43%, such as about 36 to about 43%, such as about 38 to about 41%, such as about 39%.

The polymeric blend may comprise polybutylenesuccinate.

Polybutylenesuccinate may be present at an amount of about 3 to about 12%, such as about 5 to about 11%, such as about 5 to about 10%, such as about 6 to about 8%, optionally about 7%, based on the total weight of the blend.

The polymeric blend may comprise polylactic acid.

The polymeric blend may comprise polylactic acid and about 6 to about 8% polybutylenesuccinate, based on the total weight of the blend, and said filaments may have a crystallinity of about 38 to 41%.

The fabric may comprise one or two of said polymeric blends, wherein the one or two polymeric blends collectively comprise:
(a) a first polylactic acid; and
(b) a second polylactic acid,
wherein the first polylactic acid (a) comprises a greater proportion of D-configuration lactic acid units to L-configuration lactic acid units than in the second polylactic acid (b).

The fabric may be one in which:
(a) the first polylactic acid comprises up to about 5% D-configured lactic acid units (based on the total number of lactic acid units in the polylactic acid), such as about 1 to about 5%, such as about 3 to about 5% D-configured lactic acid units, such as about 3.5% to about 4.5% D-configured lactic acid units, such as about 4% D-configured lactic acid units; and/or
(b) the second polylactic acid comprises up to about 1% D-configured lactic acid units (based on the total number of lactic acid units in the polylactic acid), such as about 0.1 to about 1% D-configured lactic acid units, such as about 0.25 to about 0.75% D-configured lactic acid units, such as about 0.5% D-configured lactic acid units.

The first polylactic acid (a) may have a lower melting point than the second polylactic acid (b).

The fabric may employ one polymeric blend and the blend may comprise about 5 to about 30% of the first polylactic acid (a) and about 63 to about 88% of the second polylactic acid (b), based on the total weight of the blend); optionally about 5 to about 20% (a) and about 73 to about 88% (b); optionally about 5 to about 15% (a) and about 78 to about 88% (b); optionally about 8 to about 12% (a) and about 81 to about 85% (b); optionally about 9 to about 11% (a) and about 82 to about 84% (b); optionally about 10% (a) and about 83% (b). It has been found that fabric comprising a minor amount of a polylactic acid having a lower melting point (e.g. a polylactic acid having a higher D content) can improve thermoform ability.

The filaments may have a shaped or engineered transverse cross section (e.g. filaments having a bi-component configuration), for example, an islands-in-the-sea, core-sheath, or segmented pie configuration.

The fabric may comprise bi-component filaments (such as a core and sheath configuration), wherein there is one polymeric blend and both components comprise the same polymeric blend.

The fabric may comprise bi-component filaments (such as a core and sheath configuration), wherein there are two polymeric blends and each component comprises a different polymeric blend. Bi-component filaments, such as core-sheath filaments, are able to utilise a polymeric blend having certain properties for the core (such as a blend with high tensile strength), with different properties for the sheath (such as a low glass transition and/or softening temperature, facilitating point bonding as set out above), resulting in the filament as a whole having combined properties not achievable with a single blend.

The fabric may comprise bi-component filaments (such as a core and sheath configuration), wherein one component comprises a polymeric blend comprising said second polylactic acid (b) and wherein the other component comprises polymeric blend comprising said first polylactic acid (a).

The fabric may comprise core and sheath configuration, wherein the core comprises a polymeric blend comprising said second polylactic acid (b) and wherein the sheath comprises a polymeric blend comprising said first polylactic acid (a).

The fabric may comprise filaments having a core comprising about 60 to about 90% of a filament, on a weight basis, such as about 70 to about 90% of a filament, such as about 75 to about 85%, optionally about 80% of a filament.

Filaments in the fabric may have a core and a sheath, wherein the polymeric blend of the core is different to the polymeric blend of the sheath. The core may comprise about 70 to about 90% of a filament, on a weight basis, such as about 75 to about 85%, optionally about 80% of a filament.

Biodegradation/composting may take place via a number of pathways, including by hydrolysis and/or oxidation. Microorganisms, such as bacteria, yeasts, fungi, and also enzymatic processes also lead to biodegradation. For instance, enzymatic degradation of aliphatic polyesters is known (see Tokiwa; Suzuki Nature 1977, 270, 76 to 78).

As is known, for a polymer to be compostable, it must break down under composting conditions. Articles and polymers that conform to the EN13432:2000 or ASTMD6400-12 standards are deemed to be biodegradable and/or compostable, and may be considered to be compostable under "commercial" conditions with elevated temperatures (i.e. temperatures elevated above about 25° C.) Advantages of biodegradable and/or compostable articles and polymers are that they can have a reduced carbon footprint, be more "environmentally friendly" (e.g. via reduction of waste to landfill), and/or be less reliant on fossil fuels for their production. It is preferred that the article conforms to the EN13432:2000 and/or ASTMD6400-12 standard.

The fabric may be for use with food or beverages. As mentioned above, food or beverage articles have particular requirements from a health and safety perspective, particularly in relation to toxicity. As a result, not all existing materials will be suitable for use in food or beverage articles, and careful consideration of the design and production of the articles of the invention is required to impart properties suitable for a given (food or beverage) application.

By way of example, cross-linking is a known technique in the art for improving polymeric integrity/strength, and is often achieved using peroxide radicals to initiate cross-linking reactions. However, peroxide radicals (and other cross-linking agents) can cause toxicity, and hence cross-linked polymers may not be suitable for use in food and beverage articles. The teachings of the present invention may be used to provide alternative articles, having suitable properties for use in food or beverage applications, without using unsuitable prior art techniques (such as cross linking).

It will be appreciated that food and beverages are often consumed and/or prepared at elevated temperatures (e.g. elevated above room temperature, about 20° C.). Thus, in some embodiments, the fabrics of the invention may be resistant to temperatures of about 40° C. or more, such as about 60° C. or more, optionally about 80° C. or more, possibly about 90° C. or more, for example about 93° C. or more, such as up to about 100° C. Such temperatures may onset rapidly, e.g. via exposure to hot water during coffee brewing. Therefore the fabrics of the invention may be resistant to rapid onset (e.g. over a period of about one second) of such temperatures as well.

It will further be appreciated that food and beverages are often prepared at elevated pressures (e.g. elevated above atmospheric pressure, about 100 kpa). As a result, fabrics used in the preparation of such food and beverages should, in some applications, be resistant to such elevated pressures as well. Thus, in some embodiments, the fabrics of the invention may be resistant to pressures of about 2 bar or more, such as about 10 bar or more. Such pressures may onset rapidly, e.g. via exposure to a pressurised liquid, such as during coffee brewing. Therefore the fabrics may be resistant to rapid onset (e.g. over a period of about one second) of such pressures as well.

The fabric may be for use in coffee and/or tea brewing, such as a filter for a coffee pod. Coffee pods may be understood to be containers providing one or more measures of coffee (e.g. in the form of powder, granules, grounds, or the like; one "measure" being usable to produce a single serving of a coffee beverage from the coffee pod) for brewing in a suitable coffee machine. Coffee pods are, in use, typically exposed to elevated temperature water (often about 93° C. or more), which is often delivered in conjunction with elevated pressure (about 2 bar or more, in some applications about 10 bar or more). The temperature and pressure used typically depends on the nature of the coffee to be processed, and the type of beverage to be produced. Optimal temperatures and pressures used in brewing coffee of different types are well known in the art.

The biodegradable and/or compostable fabric may be thermoformable at a temperature in the range of about 60° C. to 150° C.; optionally about 75° C. to 125° C., optionally about 90° C. to 120° C., optionally about 90° C. to 110° C.

The fabric may have a basis weight of about 50 to 200 gsm; optionally about 100 to 200 gsm, optionally about 125 to 200 gsm, optionally about 125 to 170 gsm, optionally about 125 to 150 gsm, optionally about 135 to 140 gsm.

The fabric may have a thickness of 0.4 mm to about 1.4 mm, such as about 0.6 mm to about 1.2 mm, such as about 0.8 mm to about 1.0 mm.

The biodegradable and/or compostable fabric may comprise continuous filaments.

The filaments may have a fineness of about 3 to 10 den, optionally about 4 to 10 den; optionally about 4.5 to 9 den; optionally about 5 to 8.5 den; optionally about 5.5 to 8 den.

The filaments may have an average diameter of about 2 to 40 µm; optionally about 10 to 30 µm; optionally about 20 to 30 µm, optionally about 25 to 30 µm; or optionally about 15 to 25 µm, such as about 17 to 23 µm, such as about 18 to 22 µm. The average diameter of the filaments may be tailored to provide desired filtration properties. The average diameter may be determined by visual inspection of microscopy images (e.g. Scanning Electron Microscopy) of a plurality of filaments.

The biodegradable and/or compostable fabric may be non-woven.

The biodegradable and/or compostable fabric may be suitable for use in filtration, as an absorbent fabric, in medical and/or hygiene applications, in insulation applications and/or as a geotextile.

According to a third aspect of the present invention there is provided a biodegradable and/or compostable filter comprising one or more layers of the fabric according to the second aspect.

The filter may comprise three layers of the biodegradable and/or compostable fabric; optionally wherein two of the layers are spun bond fabrics and the third is a melt-blown fabric, optionally wherein said melt-blown fabric is sandwiched between said two spun bond fabric layers. Such three layer constructions may be useful to take advantage of finer filtration, as achievable using melt-blown filaments, which retaining sufficient structural integrity, as provided by spunbond filaments.

The biodegradable and/or compostable filter may be suitable for brewing coffee. The biodegradable and/or compostable filter may be a dust filter.

According to a fourth aspect of the present invention there is provided a biodegradable and/or compostable beverage pod (e.g. a coffee pod) comprising the filter according to the third aspect.

According to a fifth aspect of the present invention there is provided a thermoformable and extrudable blend comprising (a) polylactic acid and (b) polybutylenesuccinate, polybutylene succinate-co-adipate, polybutylene adipate-co-terephthalate, polyhydroxyalkanoate (e.g. polyhydroxy butyrate co-hexanoate or polyhydroxy butyrate co-valerate, such as poly(3-hydroxybutyrate-co-3-hydroxyvalerate)) or polycaprolactone; wherein the blend is biodegradable and/or compostable.

The blend may be suitable for use in the process of the first aspect of the invention.

Within the blend, (a) may be present at an amount of about 98% to 2% and (b) is present at an amount of about 2% to 98%, based on the total weight of the blend; optionally wherein (a) is present at an amount of about 97% to 3% and (b) is present at an amount of about 3% to 97%; optionally wherein (a) is present at an amount of about 95% to 5% and (b) is present at an amount of about 5% to 95%; optionally wherein (a) is present at an amount of about 93% to 7% and (b) is present at an amount of about 3% to 97%; optionally wherein (a) is present at an amount of about 90% to 10% and (b) is present at an amount of about 10% to 90%.

The blend may comprise 3 to about 12%, such as about 5 to about 11%, such as about 5 to about 10%, such as about 6 to about 8%, optionally about 7%, based on the total weight of the blend.

The blend may comprise an antioxidant. The blend of the invention may be subject to high temperatures, e.g. during thermoforming and/or extrusion. Addition of an antioxidant may prevent degradation (oxidation) of the blend when at elevated temperatures (e.g. as encountered during extrusion).

The antioxidant may be present at about 2 wt %, based on the total weight of the blend. The specific antioxidant may be selected to reduce and/or prevent oxidation at an extrusion temperature. The specific antioxidant may be selected to reduce and/or prevents oxidation at a temperature of at least about 200° C., optionally at least about 210° C.; optionally at least about 220° C.; optionally at least about 230° C.; optionally at least about 240° C. The antioxidant may be Sukano PBS aoS723 (previously named TA-45-08 MB 13) as commercially available from Sukano.

The blend may further comprise a further polymer selected from polybutylene adipate-co-terephthalate, polycaprolactone or a polyhydroxyalanoate (e.g. polyhydroxy butyrate co-hexanoate or polyhydroxy butyrate co-valerate, such as poly(3-hydroxybutyrate-co-3-hydroxyvalerate). The further polymer may be present at a level up to about 10 wt %, based on the total weight of the blend; optionally about 5 to 10%; optionally about 10%.

The blend may further comprise one or more plasticisers, lubricants, compatibilisers, colourants, light (e.g. UV light) and/or heat stabilisers, nucleating agents, and/or coated and/or non-coated fillers (such as calcium carbonate; clays, including talc and nanoclays; mica; starch; wollastonite; dolomites; silicates; kaolin; silicas; metallic powders).

According to further aspects of the invention there is provided a biodegradable and/or compostable filament (a) obtainable by the process according to the first aspect; and/or (b) suitable for use in the biodegradable and/or compostable fabric according to the second aspect; and/or (c) suitable for use in the biodegradable and/or compostable filter according to the third aspect; (d) and/or comprising the blend of the fifth aspect.

Features described above in relation to the first, second, third, fourth, fifth and other aspects of the present invention also represent features of the each other aspects of the present invention (and vice versa) subject to a technical incompatibility that would prevent such a combination of preferred features. Furthermore, it will be evident to the skilled person that advantages set out above in respect of the first, second, third, fourth, fifth and other aspects of the present invention are also offered by each other aspect of the present invention (again and vice versa).

In the event that a feature is described in relation to a product, converting such a feature to feature for a process may be achieved by specifying that a given process or relevant processing feature is "configured to" or "suitable for" achieving the relevant product feature. Similarly, in the event that a feature is described in relation to a process, converting such a feature to feature for a product may be achieved by specifying that a given product is "obtainable by" or "obtained by" the relevant process feature.

Suitable, non-limiting, commercial suppliers for the materials used in the present invention are set out below.

| Polymer type | Product ID | Commercial supplier | Commercially Supplied for: |
|---|---|---|---|
| PLA | Ingeo 6252D | Natureworks | Meltblown |
| PLA | Ingeo 6260D | Natureworks | Meltblown |
| PLA | Ingeo 6752D | Natureworks | Spundbond |
| PLA | Ingeo 6100D | Natureworks | Spundbond |
| PLA | Ingeo 6362D | Natureworks | |
| PBS | Bionelle 1020MD | Showa-Denko | |
| PBS | Enpol G4560J | Samsung | |
| PBS | GSPla FZ71PD | Mitsubishi | |
| PBS | GSPla FZ71PM | Mitsubishi | |
| PCL | Capa 6800 | Perstorp AB | |
| PBSA | GSPla FZ92WD | Mitsubishi | |
| PBSA | GSPla FZ92PM | Mitsubishi | |
| PHBV | 10020EM | Ecomann | |
| PBAT | Ecoflex F1200 | B.A.S.F. | |

Where PLA means polylactic acid; PBS means polybutylene succinate; PCL means polycaprolactone; PBSA means polybutylene succinate co-adipate; PHBV means polyhydroxyalkanoate and PBAT means polybutylene adipate-co-terephthalate.

Commercially available components suitable for use in the present invention are as follows:

| Ingredient type | Commercial supplier | Product ID |
|---|---|---|
| Talc | Magsil | extrafine |
| Lubricant | Croda | Atmer 103 |
| Lubricant | Croda | Atmer 129 |

| Ingredient type | Commercial supplier | Product ID |
| --- | --- | --- |
| Melt strength enhancer | Dow | Paraloid 250BPMS |
| Anti-oxidant | Sukano | Sukano PBS aoS723 (previously named TA-45-08 MB 13) |

The invention will now be described with reference to the following non-limiting figures and examples in which.

A typical extrusion process for producing a fabric in accordance with the present invention is described below, with reference to FIGS. 1 and 2.

Figure 1:
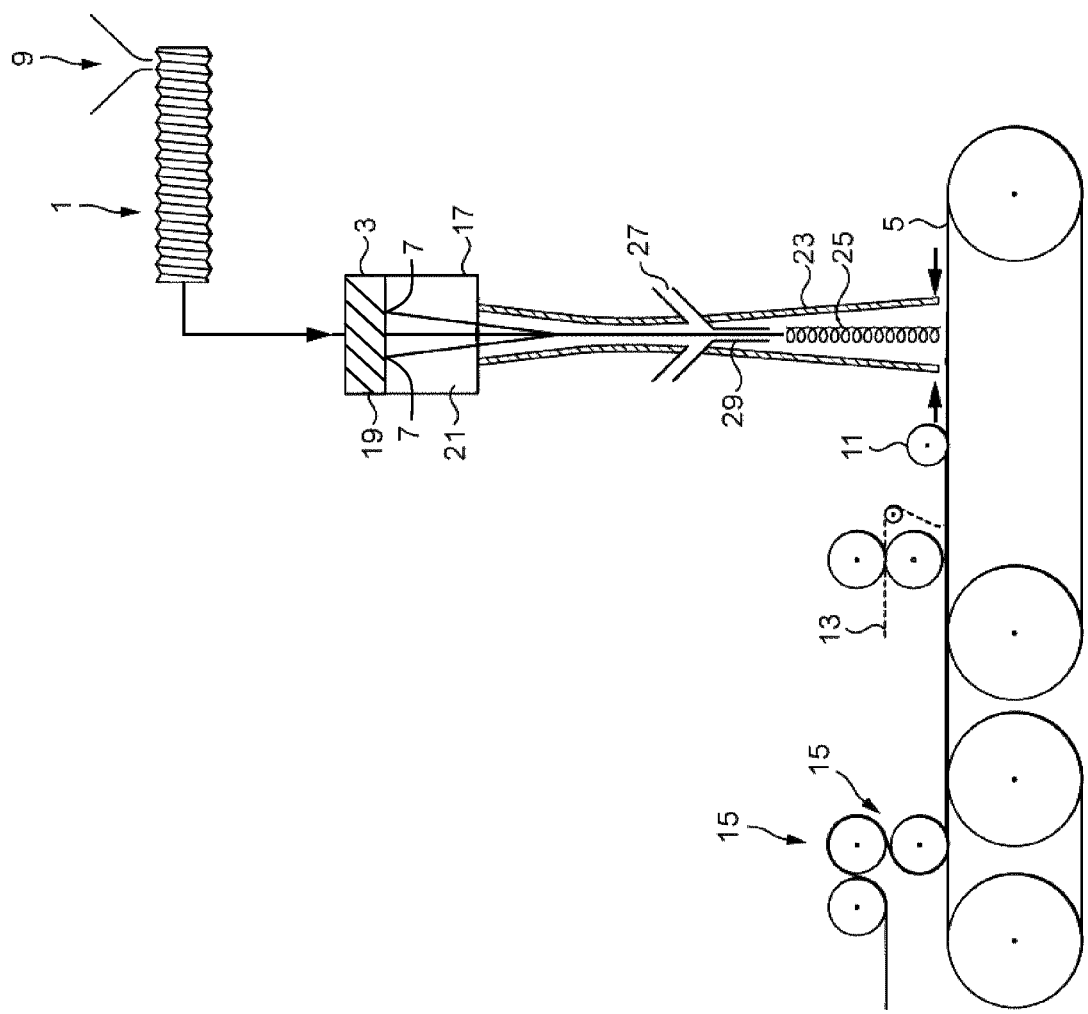
FIG. 1 shows a schematic for a spun-bonding extrusion process according to the present invention.
Figure 2:
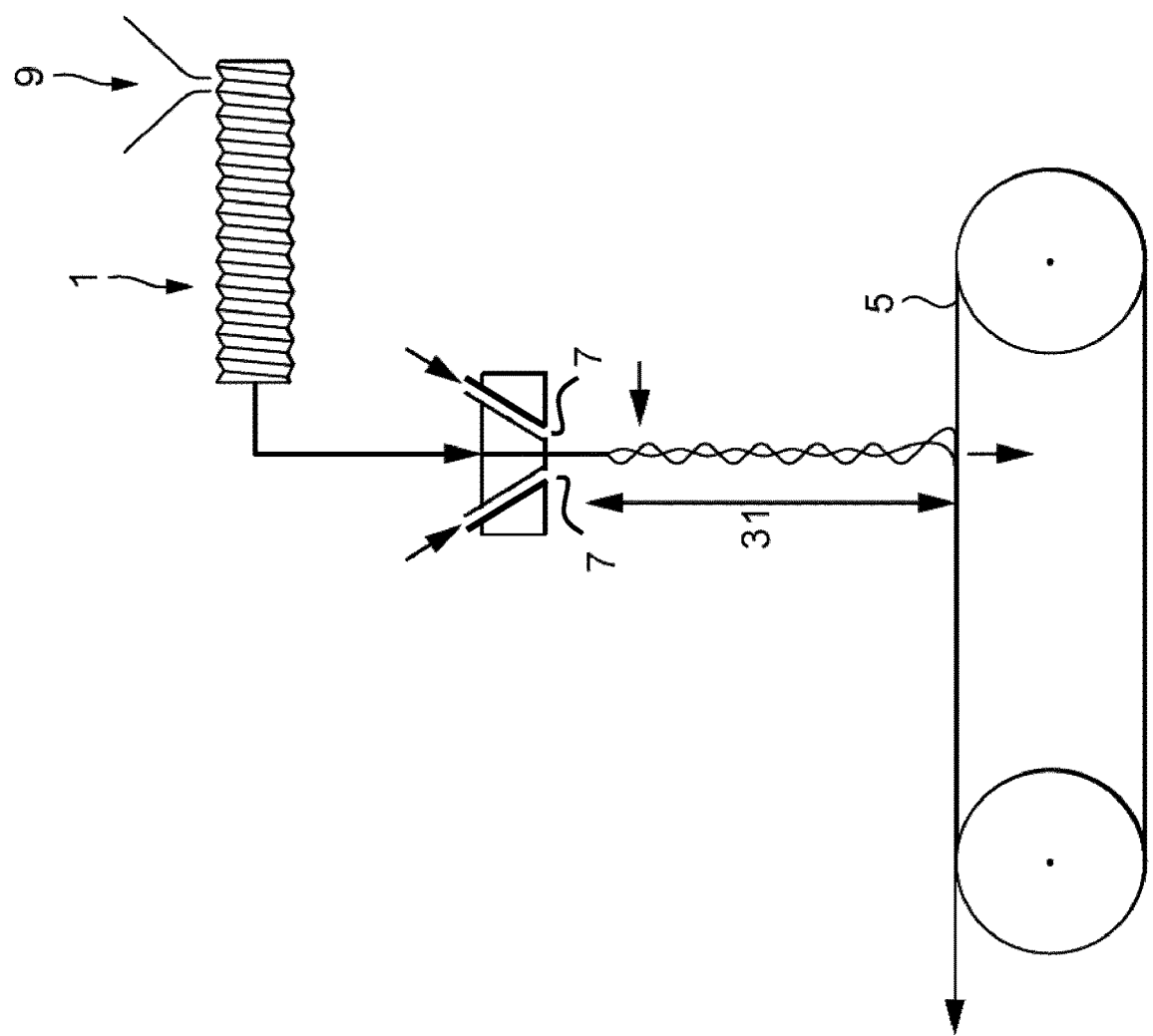
FIG. 2 shows a schematic for a melt blowing extrusion process according to the present invention.

FIGS. 1 and 2 each comprise an extruder 1, fluidly connected to an extrusion die block 3 for producing a filament of extruded material. The material is directed to a conveyer belt 5 for consolidation and thereafter conveyed away for downstream processing.

The extruder 1 comprises a cylindrical barrel fitted with a threaded cylindrical screw co-axially disposed within and rotatable with respect to the barrel (barrel and screw not shown in the schematic drawings). The function of the screw is to force molten material through the barrel and out of orifices 7 in the die block 3. Material may be metered into the extruder. Molten material flows through grooves in the threaded screw when being forced through the barrel.

The screw is driven by a motor, and the speed of rotation of the screw can be controlled by adjustment of the motor operating settings. The speed of rotation of the screw can be adjusted to tune the pressure at which the molten material is pumped (the "extruder pressure").

It is not necessary to mix materials (e.g. in the form of powder, pellets, or liquids) prior to extrusion; transit through the extruder 1 will result in sufficient mixture. In the case of extruding a polymeric blend, therefore, it will be appreciated that individual components of the blend (e.g. the individual polymers) may be added separately to the extruder feed zone 9 as discrete powder/pellets with no prior mixture (each individual particle of powder or each individual pellet corresponding to a single component polymer). The action of the screw then causes the components to become mixed as the materials pass towards the die. Alternatively, the components may be mixed prior to adding to the extruder 1, if desired, and extruded together.

The extruder 1 is divided into five distinct zones, namely a first "feed zone" 9, and four further downstream zones (Z1-Z4; zones Z1-Z4 not depicted) within and leading along the barrel successively towards the die block. The materials for adding to the feed zone and the feed zone itself are typically held at a relatively low temperature. The zones may be held at successively higher temperatures from the feed zone to the final zone (Z4), to provide gradual heating of the mixture. The final zone, Z4, may be at a temperature equivalent to the die block 3.

The molten blend is then pumped through the die block 3 by means of a melt pump (not depicted), which may also be held at the same temperature of the die and Z4, to ensure temperature consistency and/or consistency of polymer output. The molten material forms liquid jets of material upon exiting orifices in the die block 3. The pressure of the molten polymer just prior to leaving as jets can be measured (the so-called "die pressure").

The flow rate of the molten polymer can be calculated from the amount of molten liquid leaving the die block 3 and the throughput can be calculated from the weight of polymer leaving the die block 3. The throughput can be quoted on a weight per holes per minute basis and equivalent throughput on a kilogram per hour basis, given a 1.1 meter die with a fixed number of orifices 7 per meter.

The jets and downstream filaments leaving the die block 3 are thereafter laid onto a conveyer for compaction 5 and downstream processing. The filaments may be considered as a web of filaments once laid.

After laying, the web is passed by a conveyer belt 5 and/or a series of rollers for finishing. The web may be compressed using one or more rollers 11 (FIG. 1 only).

The fabric may be subject to calendering. Calendering involves pressing the fabric between rollers 13 (FIG. 1 only) at an elevated temperature ("calendar roll temp.") to yield a fabric having a thickness (thickness post calendar). The fabric may also be subject to entanglement, e.g. using hydro-entanglement jets 15 (FIG. 1 only)

Referring to FIG. 1, there is shown therein a spunbonding embodiment of the process of the invention. Upon exiting the die 3, the filaments are subject to drawing tensile force, causing the filaments to become elongated.

The jets are cooled, causing the molten material to solidify and thereby form solid filaments of the material, the filaments corresponding to the jets. Cooling is achieved by exposing the liquid jets of material to quenching air upon exiting the die 3 (e.g. air at a "quenching temperature" sufficient to solidify the material). In the spundbonding technique illustrated, the quenching fluid is configured to cause the jets to solidify as a continuous filament leaving the die 3. Quenching is conducted in a chamber 17 (so-called "spinning chamber") to assist in maintaining ambient conditions (e.g. temperature and pressure around the die orifices).

The spinning chamber has a length (in the machine direction, through which filaments traverse upon leaving the orifices) of about 1 m to 1.5 m, width of about 1.3 m, depth of about 0.45 m and a downstream outlet gap of about 80 mm. The spinning chamber has have a first zone 19 (i.e. which filaments encounter first upon traversing the spinning chamber) in which quenching air is provided at a temperature of about 20° C. to 40° C. and a second zone 21 in which quenching and drawing air is provided at a temperature of about 15° C. to 30° C.

The solidified filaments then pass from the quenching chamber 17 through a shaft 23. The shaft 23 is configured to provide a turbulent flow of air in the form of a vortex 25, causing the filaments to spread out in all directions before being lain onto the conveyer belt 5 as described above. The shaft 23 is provided with an inlet 27 (SAS gap) for permitting air flow into the shaft 23 and modifying filament spreading. The gap of the pre-diffuser exit 29 influences filament spreading as well.

Referring to FIG. 2, there is shown therein a melt blowing embodiment of the process of the invention. Melt blowing is an alternative type of extrusion to spun bonding. In melt blowing, upon exiting the die 3 liquid jets of material are exposed to a high velocity hot gas flow (such as about 200° C. to 260° C.). The gas flow disrupts the liquid jet and separates sections of the jet from one another, with the result that the filaments solidifying therefrom are short, fine and may be discontinuous. The thereafter filaments fall onto the conveyer belt 5 as described above, the distance of the fall being referred to as the blow height 31.

The following examples are merely illustrative examples of the invention described herein, and are not intended to be limiting upon the scope of the invention.

EXAMPLE 1

A series of blends were prepared for subsequent extrusion, in accordance with the blend components listed in the table below.

In the table, PLA means polylactic acid; PBS means polybutylenesuccinate; PHBV means polyhydroxyalkanoate PBAT means polybutylene adipate-co-terephthalate, and PP means polypropylene.

DP316-DP319 and DP323 were produced using spunbonding, whereas the others were melt blown.

|  | DP286 | DP285 | DP294 | DP296 |
|---|---|---|---|---|
| Air knife pressure (bar) | 0.09 | 0.11 | 0.09 | 0.12 |
| Air knife flow rate (L/min) | 1045 | 1105 | 1105 | 1175 |
| Blow height (cm) | 17.5 | 28 | 28 | 40 |
| Fabric weight (gsm) | 150 | 175 | 175 | 172 |
| Filament diam range (μm) | 18-22 | 21-31 | 21-31 | 25 |
| Spinneret hole diam (mm) | 0.13 | 0.13 | 0.13 | 0.13 |
| Spinneret hole length (mm) | 0.65 | 0.65 | 0.65 | 0.65 |
| Calendar roll temp (° C.) | 87 | 83 | 84.5 | 83 |
| Thickness post calender (mm) | 0.32 | 0.4 | 0.34 | 0.38 |
| Holes/in (81 in 0.1 m) | 18.7 |  |  |  |
| Throughput (g/hole/min) | 0.163 | 0.190123 |  | 0.190123 |

| | PLA [%] | | PBS [%] | | PHBV [%] | PBAT [%] | PP [%] | Talc [%] | Stearate [%] | Melt strength enhancer [%] | Anti-oxidant [%] |
|---|---|---|---|---|---|---|---|---|---|---|---|
| Generic name | | | | | | | | | | | |
| Commercial name | Ingeo 6252D | Ingeo 6100 | Bionelle 1020MD | Enpol G4560J | GSPIa FZ71PD | Ecomann 10020EM | Ecoflex F1200 | Braskem CP380G | Magsil extrafine | Atmer 103 | Paraloid 250BPMS | TA-45-08 MA13 |
| DP249 | 33 | | 64.5 | | | | | | 1 | 1.5 | | |
| DP250 | 49 | | 48.5 | | | | | | 1 | 1.5 | | |
| DP251 | 64.5 | | 33 | | | | | | 1 | 1.5 | | |
| DP252 | 80 | | 18.75 | | | | | | 1 | 0.25 | | |
| DP253 | 0 | | 49.25 | | | 49.25 | | | 1 | 0.5 | | |
| DP254 | 0 | | 73.5 | | | 25 | | | 1 | 0.5 | | |
| DP256 | 90 | | 8 | | | | | | 1 | 1 | | |
| DP269 | 68.25 | | 29.25 | | | | | | 1 | 1.5 | | |
| DP285 | 38 | | 60 | | | | | | 1 | 1 | | |
| DP286 | 30 | | 68 | | | | | | 1 | 1 | | |
| DP293 | 30 | | | 68 | | | | | 1 | 1 | | |
| DP294 | 38 | | | 60 | | | | | 1 | 1 | | |
| DP296 | 38 | | | | 60 | | | | 1 | 1 | | |
| DP307 | 18 | | | | 80 | | | | 1 | 1 | | |
| DP310 | 11.13 | | | | 86.67 | | | | 1.1 | 1.1 | | |
| DP311 | 36.1 | | | | 57 | | | 5 | 0.95 | 0.95 | | |
| DP314 | 11.11 | | | | 81.67 | | 5 | | 1.11 | 1.11 | | |
| DP315 | 11.11 | | | | 76.67 | | 10 | | 1.11 | 1.11 | | |
| DP316 | | 11.11 | | | 86.67 | | | | 1.11 | 1.11 | | |
| DP317 | | 11.13 | | | 81.67 | | 5 | | 1.1 | 1.1 | | |
| DP318 | | 11.4 | | | 86.6 | | | | | | 2 | |
| DP319 | | 23 | | | 75 | | | | 1 | 1 | | |
| DP323a | | | | | 100 | | | | | | | 0 |
| DP323b | | | | | 98 | | | | | | | 2 |

EXAMPLE 2

A series of fabrics were extruded in accordance with the typical melt blow extrusion technique set out above, adopting the processing parameters set out in the table below.

|  | DP286 | DP285 | DP294 | DP296 |
|---|---|---|---|---|
| Die pressure (bar) | 45 | 62 | 24 | 39 |
| Melt temp (° C.) | 219 | 196 | 215 | |
| Air knife temp at head (° C.) | 240 | 240 | 240 | 270 |

Tests were run on a lab scale melt blown line (approximate line width 15 cm). Used at Fibre Extrusion Technologies (Leeds).

EXAMPLE 3

A further series of fabrics were extruded in accordance with the typical melt blow extrusion technique set out above, adopting the processing parameters set out in the table below. Tests were run on a Reicofil MB melt-blown line: a 1.1 m wide model commercial line, used at The Non-wovens Institute, North Carolina Stat Uni, Raleigh.

| Resin | Die (holes per inch/diamete, mm) | Die melt T (° C.) | Die pressure (bar) | Air knife temp (° C.) | Air knife flow rate (m3/hour) | Quench air temperature (° C.) | Blow height (mm) | Throughput (kg/hour) | Basis weight (g/m²) | Additional resin, OPP (% w/w) |
|---|---|---|---|---|---|---|---|---|---|---|
| DP294 | 35/0.4 | 255 | 8 | 273 | 800 | 12.2 | 221 | 58 | 175 | |
| DP294 | 35/0.4 | 254 | 8 | 274 | 900 | 12.1 | 300 | 58 | 175 | |
| DP294 | 35/0.4 | 255 | 8 | 272 | 950 | 11.2 | 501 | 58 | 177 | |
| DP285 | 35/0.3 | 233 | 39 | 255 | 800 | 25 | 230 | 56 | 172 | |
| DP285 | 35/0.3 | 233 | 28 | 255 | 799 | 25 | 230 | 46 | 142 | |
| DP296 | 20/0.6 | 254 | 14 | 324 | 500 | 12 | 250 | 52 | 224 | |
| DP296 | 20/0.6 | 254 | 13 | 328 | 500 | 12 | 300 | 52 | 223 | |
| DP296 | 35/0.4 | 264 | 7 | 285 | 302 | 12 | 350 | 27 | 202 | |
| DP296 | 35/0.4 | 264 | 7 | 285 | 300 | 11.9 | 250 | 27 | 201 | |
| DP310 | 35/0.4 | 286 | 18 | 284 | 400 | 25 | 200 | 42 | 180 | |
| DP317 | 35/0.4 | 287 | 24 | 290 | 400 | 25.1 | 200 | 43 | 188 | |
| DP310 | 35/0.4 | 286 | 20 | 290 | 401 | 24.8 | 200 | 43 | 183 | |
| DP296 | 35/0.4 | 286 | 14 | 292 | 400 | 12 | 200 | 46 | 200 | 5 |
| DP297 | 35/0.4 | 285 | 21 | 285 | 399 | 12 | 200 | 60 | 101 | |
| DP296 | 35/0.4 | 287 | 14 | 294 | 301 | 12 | 300 | 46 | 202 | |
| DP296 | 35/0.4 | 286 | 14 | 296 | 300 | 12 | 250 | 46 | 201 | |
| DP296 | 35/0.4 | 286 | 15 | 290 | 400 | 11.9 | 200 | 43 | 202 | 7 |

OPP (oriented polypropylene) resin used was Braskem 360H grade.

EXAMPLE 4

A further series of fabrics were extruded in accordance with the typical spunbond extrusion technique set out above, adopting the processing parameters set out in the table below. Tests were run on a Reicofil 4 spun-bond line, STFI (Saxony Textile Institute), Chemnitz, Germany.

| trial no. | 570 | 571 | 572 | 573 | 574 | 575 | 576 | 577 | 578 | 579 |
|---|---|---|---|---|---|---|---|---|---|---|
| Resin C1: PLA 6100 D (core) | x | x | x | x | x | x | x | x | x | x |
| Resin C2: PLA 6752 D (sheath) | x | x | x | x | x | x | x | x | x | x |
| auxiliary component C1/C2: GS Pla 71PD [%] (core/sheath) | 5 | 5 | 5 | 8 | 8 | 7 | 7 | 7 | 7 | 7 |
| throughput per hole [g/min * hole] | 0.7 | 0.7 | 0.78 | 0.78 | 0.78 | 0.78 | 0.78 | 0.78 | 0.78 | 0.78 |
| fabric weight (SET) [gsm] | 125 | 110 | 125 | 125 | 125 | 110 | 135 | 125 | 125 | 125 |
| throughput ratio C1:C2 | 80:20 | 80:20 | 80:20 | 80:20 | 80:20 | 80:20 | 80:20 | 80:20 | 80:20 | 80:20 |
| melt temperature die C1 [° C.] | 233 | 235 | 235 | 235 | 234 | 234 | 235 | 234 | 234 | 234 |
| melt temperature die C2 [° C.] | 234 | 234 | 234 | 234 | 235 | 233 | 235 | 234 | 235 | 235 |
| melt pressure die C1 [bar] | 122 | 121 | 130 | 127 | 128 | 129 | 130 | 132 | 132 | 132 |
| melt pressure die C2 [bar] | 108 | 105 | 114 | 110 | 110 | 114 | 112 | 115 | 114 | 113 |
| cabin pressure (SET) [Pa] | 6000 | 6000 | 4000 | 4000 | 4000 | 4000 | 4000 | 4000 | 4000 | 4000 |
| process air volume Q1 [m³/h] | 1551 | 1254 | 927 | 693 | 768 | 932 | 762 | 783 | 940 | 875 |
| process air volume Q2 [m³/h] | 6918 | 6858 | 5781 | 5716 | 5582 | 5716 | 5521 | 5838 | 5616 | 5816 |
| process air temperature Q1 [° C.] | 40 | 40 | 40 | 40 | 40 | 40 | 40 | 40 | 40 | 40 |
| process air temperature Q2 [° C.] | 20 | 20 | 20 | 20 | 20 | 20 | 20 | 20 | 20 | 20 |
| SAS gap (exit) [mm] | 20 | 20 | 20 | 20 | 20 | 20 | 20 | 20 | 20 | 20 |
| gap diffusor exit [mm] | 119 | 119 | 119 | 119 | 142 | 142 | 142 | 142 | 142 | 142 |
| filament fineness [den] | 4.55 | — | 5.99 | — | — | — | — | — | — | — |
| filament diameter [μm] - Filament | 22.78 | — | 26.14 | — | — | — | — | — | — | — |
| fabric weight [gsm] | 126.3 | 108.1 | 122 | 121.2 | 120.5 | 106.7 | 121.3 | 126.1 | 132.5 | 121.6 |

| trial no. | 946 | 947 | 948 | 949 | 950 | 951 | 952 | 953 | 954 | 955 |
|---|---|---|---|---|---|---|---|---|---|---|
| Resin C1: PLA 6100 D (core) | x | x | x | x | x | x | x | x | x | x |
| Resin C2: PLA 6752 D (sheath) | x | x | x | x | x | x | x | x | x | x |
| auxiliary component C1/C2: GS Pla 71PD [%] (core/sheath) | 7 | 7 | 7 | 7 | 7 | 7 | 7 | 7 | 7 | 8 |

-continued

| | | | | | | | | | | |
|---|---|---|---|---|---|---|---|---|---|---|
| throughput per hole [g/min * hole] | 2.02 | 2.02 | 2.02 | 2.02 | 2.02 | 2.02 | 2.02 | 2.02 | 2.02 | 2.02 |
| fabric weight (SET) [gsm] | 140 | 140 | 140 | 140 | 140 | 140 | 140 | 140 | 140 | 140 |
| throughput ratio C1:C2 | 80:20 | 80:20 | 80:20 | 80:20 | 80:20 | 80:20 | 80:20 | 80:20 | 80:20 | 80:20 |
| melt temperature die C1 [° C.] | 233 | 234 | 234 | 233 | 234 | 234 | 233 | 233 | 234 | 233 |
| melt temperature die C2 [° C.] | 234 | 235 | 235 | 233 | 234 | 234 | 233 | 233 | 234 | 234 |
| melt pressure die C1 [bar] | 115 | 114 | 115 | 117 | 114 | 114 | 118 | 116 | 116 | 118 |
| melt pressure die C2 [bar] | 106 | 105 | 105 | 107 | 105 | 103 | 106 | 104 | 103 | 104 |
| cabin pressure (SET) [Pa] | 4000 | 4000 | 4000 | 4000 | 4000 | 4000 | 4000 | 3500 | 3500 | 3500 |
| process air volume Q1 [m³/h] | 1034 | 998 | 933 | 920 | 913 | 961 | 1020 | 948 | 932 | 948 |
| process air volume Q2 [m³/h] | 5911 | 5859 | 5920 | 5560 | 5968 | 5751 | 6150 | 5499 | 5456 | 8316 |
| process air temperature Q1 [° C.] | 40 | 40 | 40 | 40 | 30 | 25 | 25 | 25 | 25 | 25 |
| process air temperature Q2 [° C.] | 20 | 20 | 20 | 20 | 20 | 15 | 15 | 15 | 15 | 20 |
| SAS gap (exit) [mm] | 20 | 20 | 20 | 20 | 20 | 20 | 22 | 20 | 20 | 20 |
| gap diffusor exit [mm] | 89 | 99 | 111 | 142 | 108 | 108 | 108 | 111 | 99 | 99 |
| filament fineness [den] | | | | | | | | | | — |
| filament diameter [μm] - Filament | 25.77 | 27.67 | 28.14 | 28.41 | 27.04 | 28.68 | 27.43 | 28.15 | 29.49 | — |
| fabric weight [gsm] | 139.1 | 139.9 | 139.1 | 132.7 | 138.3 | 139.3 | 140.4 | 144.3 | 140.8 | 144.3 |

| trial no. | 196 | 197 | 198 | 199 | 200 |
|---|---|---|---|---|---|
| Resin C1: PLA 6100 D (core) | — | — | — | — | — |
| Resin C2: PLA 6752 D (sheath) | x | x | x | x | x |
| auxiliary component C1/C2: GS Pla 71PD [%] (core/sheath) | 7 | 7 | 7 | 7 | 7 |
| throughput per hole [g/min * hole] | 0.93 | 0.93 | 0.93 | 0.93 | 0.93 |
| fabric weight (SET) [gsm] | 140 | 140 | 140 | 120 | 120 |
| throughput ratio C1:C2 | 69:31 | 69:31 | 69:31 | 69:31 | 69:31 |
| melt temperature die C1 [° C.] | 236 | 236 | 236 | 236 | 236 |
| melt temperature die C2 [° C.] | 239 | 239 | 239 | 239 | 239 |
| melt pressure die C1 [bar] | 86 | 86 | 86 | 87 | 87 |
| melt pressure die C2 [bar] | 70 | 70 | 70 | 71 | 71 |
| cabin pressure (SET) [Pa] | 3500 | 3500 | 3500 | 3500 | 3000 |
| process air volume Q1 [m³/h] | 1304 | 1204 | 1513 | 1100 | 927 |
| process air volume Q2 [m³/h] | 5321 | 5191 | 5226 | 5230 | 4944 |
| process air temperature Q1 [° C.] | 35 | 35 | 35 | 35 | 35 |
| process air temperature Q2 [° C.] | 25 | 25 | 25 | 25 | 25 |
| SAS gap (exit) [mm] | 20 | 20 | 20 | 20 | 20 |
| gap diffusor exit [mm] | 111 | 131 | 142 | 142 | 142 |

-continued

| | | | | | | | | | | |
|---|---|---|---|---|---|---|---|---|---|---|
| filament fineness [den] | | 3.29 | — | — | | 3.03 | | 3.69 | | |
| filament diameter [µm] - Filament | | | | | | | | | | |
| fabric weight [gsm] | | 130 | 126.3 | 128.5 | | 119.7 | | 117.3 | | |

| trial no. | 755 | 756 | 757 | 758 | 759 | 760 | 761 | 762 | 763 | 764 | 765 |
|---|---|---|---|---|---|---|---|---|---|---|---|
| Resin C1: PLA 6100 D (core) | x | x | x | x | x | x | x | x | x | x | x |
| Resin C2: PLA 6100 D (sheath) | — | — | — | — | — | — | — | — | — | — | — |
| Resin C1: PLA 6752 D (core) | — | — | — | — | — | — | — | — | — | — | — |
| Resin C2: PLA 6752 D (sheath) | x | x | x | x | x | x | x | x | x | x | x |
| auxiliary component C1/C2: GS Pla 71PD [%] (core/sheath) | 7 | 7 | 7 | 7 | 7 | 7 | 7 | 7 | 7 | 7 | 7 |
| throughput per hole [g/min * hole] | 2.02 | 2.02 | 2.02 | 2.02 | 2.02 | 2.02 | 2.02 | 2.02 | 2.02 | 2.02 | 2.02 |
| fabric weight (SET) [gsm] | 125 | 125 | 125 | 150 | 130 | 130 | 130 | 130 | 130 | 130 | 130 |
| throughput ratio C1:C2 | 80:20 | 80:20 | 80:20 | 80:20 | 80:20 | 80:20 | 80:20 | 80:20 | 80:20 | 80:20 | 80:20 |
| melt temperature die C1 [° C.] | 233 | 234 | 234 | 234 | 234 | 235 | 234 | 235 | 235 | 235 | 235 |
| melt temperature die C2 [° C.] | 234 | 235 | 235 | 235 | 235 | 235 | 235 | 235 | 235 | 235 | 235 |
| melt pressure die C1 [bar] | 128 | 127 | 127 | 127 | 127 | 127 | 124 | 122 | 122 | 122 | 122 |
| melt pressure die C2 [bar] | 110 | 109 | 109 | 110 | 110 | 110 | 112 | 111 | 110 | 110 | 111 |
| cabin pressure (SET) [Pa] | 4000 | 4000 | 4000 | 4000 | 4000 | 5000 | 4000 | 4000 | 4000 | 4500 | 4500 |
| process air volume Q1 [m³/h] | 839 | 729 | 1065 | 987 | 927 | 1202 | 1014 | 1087 | 1165 | 1127 | 1244 |
| process air volume Q2 [m³/h] | 5399 | 5538 | 5751 | 5773 | 5734 | 6293 | 5681 | 5712 | 5668 | 5964 | 5972 |
| process air temperature Q1 [° C.] | 40 | 40 | 40 | 40 | 40 | 40 | 30 | 30 | 40 | 40 | 40 |
| process air temperature Q2 [° C.] | 20 | 20 | 20 | 20 | 20 | 20 | 20 | 20 | 20 | 20 | 20 |
| SAS gap (exit) [mm] | 20 | 20 | 20 | 20 | 20 | 20 | 20 | 20 | 20 | 20 | 20 |
| gap pre-diffusor (exit) [mm] | 20 | 20 | 24 | 24 | 24 | 24 | 24 | 24 | 24 | 24 | 24 |
| filament fineness [den] | 6.23 | — | — | — | 5.33 | 5.64 | — | — | 5.58 | — | |
| fabric weight [gsm] | 138.6 | 142.7 | 138.8 | 146.2 | 129.7 | 139.5 | 139.1 | 147.6 | 148 | 129.9 | 130.2 |

| trial no. | 766 | 767 | 768 | 769 | 770 | 771 | 772 | 773 | 774 |
|---|---|---|---|---|---|---|---|---|---|
| Resin C1: PLA 6100 D (core) | x | x | x | x | x | x | x | x | x |
| Resin C2: PLA 6100 D (sheath) | — | x | x | x | x | x | x | x | x |
| Resin C1: PLA 6752 D (core) | — | — | — | — | — | — | — | — | — |
| Resin C2: PLA 6752 D (sheath) | x | — | — | — | — | — | — | — | — |
| auxiliary component C1/C2: GS Pla 71PD [%] (core/sheath) | 7 | 7 | 7 | 7 | 7 | 7 | 7 | 7 | 7 |
| throughput per hole [g/min * hole] | 2.02 | 2.02 | 2.02 | 2.02 | 2.02 | 2.02 | 2.02 | 2.02 | 2.02 |

| | | | | | | | | | |
|---|---|---|---|---|---|---|---|---|---|
| fabric weight (SET) [gsm] | 130 | 140 | 130 | 140 | 130 | 140 | 130 | 140 | 130 |
| throughput ratio C1:C2 | 80:20 | 80:20 | 80:20 | 80:20 | 80:20 | 80:20 | 80:20 | 80:20 | 80:20 |
| melt temperature die C1 [° C.] | 235 | 233 | 234 | 234 | 235 | 235 | 235 | 235 | 235 |
| melt temperature die C2 [° C.] | 235 | 232 | 233 | 233 | 234 | 234 | 234 | 234 | 234 |
| melt pressure die C1 [bar] | 123 | 119 | 116 | 116 | 115 | 115 | 114 | 114 | 114 |
| melt pressure die C2 [bar] | 111 | 95 | 93 | 93 | 91 | 91 | 91 | 91 | 91 |
| cabin pressure (SET) [Pa] | 4500 | 4500 | 4500 | 4500 | 4500 | 4500 | 4500 | 4000 | 4000 |
| process air volume Q1 [m³/h] | 1124 | 1431 | 1360 | 975 | 1021 | 1001 | 1042 | 935 | 799 |
| process air volume Q2 [m³/h] | 5985 | 5942 | 6072 | 6055 | 5985 | 5985 | 6059 | 5747 | 5773 |
| process air temperature Q1 [° C.] | 40 | 40 | 40 | 40 | 40 | 40 | 40 | 40 | 40 |
| process air temperature Q2 [° C.] | 20 | 20 | 20 | 20 | 20 | 20 | 20 | 20 | 20 |
| SAS gap (exit) [mm] | 20 | 20 | 20 | 20 | 20 | 20 | 20 | 20 | 20 |
| gap pre-diffusor (exit) [mm] | 24 | 24 | 24 | 24 | 24 | 24 | 24 | 24 | 24 |
| filament fineness [den] | — | 6.01 | — | — | — | — | — | 5.99 | — |
| fabric weight [gsm] | 129.4 | 142.3 | 129.9 | 140.8 | 130.9 | 138.1 | 129.8 | 137.3 | 130.3 |

| trial no. | 775 | 776 | 777 | 778 | 779 | 780 | 781 | 782 | 783 | 784 |
|---|---|---|---|---|---|---|---|---|---|---|
| Resin C1: PLA 6100 D (core) | x | x | x | x | x | x | — | — | x | x |
| Resin C2: PLA 6100 D (sheath) | x | x | x | x | x | x | — | — | x | — |
| Resin C1: PLA 6752 D (core) | — | — | — | — | — | — | x | x | — | — |
| Resin C2: PLA 6752 D (sheath) | — | — | — | — | — | — | x | x | x | x |
| auxiliary component C1/C2: GS Pla 71PD [%] (core/sheath) | 7 | 7 | 7 | 7 | 7 | 7 | 7 | 7 | 8 | 8 |
| throughput per hole [g/min * hole] | 2.02 | 2.02 | 2.02 | 2.02 | 2.02 | 2.02 | 2.02 | 2.02 | 2.02 | 2.02 |
| fabric weight (SET) [gsm] | 140 | 130 | 140 | 130 | 140 | 140 | 140 | 140 | 140 | 140 |
| throughput ratio C1:C2 | 80:20 | 80:20 | 80:20 | 80:20 | 80:20 | 80:20 | 66:34 | 66:34 | 80:20 | 80:20 |
| melt temperature die C1 [° C.] | 235 | 235 | 235 | 235 | 235 | 235 | 247 | 247 | 236 | 236 |
| melt temperature die C2 [° C.] | 234 | 234 | 234 | 234 | 234 | 234 | 249 | 249 | 239 | 238 |
| melt pressure die C1 [bar] | 115 | 114 | 114 | 115 | 116 | 115 | 122 | 121 | 119 | 120 |
| melt pressure die C2 [bar] | 91 | 90 | 90 | 91 | 91 | 90 | 119 | 118 | 109 | 109 |
| cabin pressure (SET) [Pa] | 4000 | 4000 | 5000 | 5000 | 5000 | 5500 | 6000 | 6000 | 4000 | 4000 |
| process air volume Q1 [m³/h] | 932 | 832 | 1095 | 1065 | 1019 | 1170 | 1228 | 1280 | 1100 | 1088 |
| process air volume Q2 [m³/h] | 5751 | 5738 | 6324 | 6359 | 6324 | 6593 | 6866 | 6905 | 5994 | 5707 |
| process air temperature Q1 [° C.] | 40 | 40 | 40 | 40 | 40 | 40 | 40 | 40 | 40 | 40 |

-continued

| | | | | | | | | | | |
|---|---|---|---|---|---|---|---|---|---|---|
| process air temperature Q2 [° C.] | 20 | 20 | 20 | 20 | 20 | 20 | 20 | 20 | 20 | 20 |
| SAS gap (exit) [mm] | 20 | 20 | 20 | 20 | 20 | 20 | 20 | 20 | 20 | 20 |
| gap pre-diffusor (exit) [mm] | 24 | 24 | 24 | 24 | 24 | 24 | 24 | 24 | 24 | 24 |
| filament fineness [den] | — | — | 5.27 | — | — | 5.22 | — | 4.92 | — | — |
| fabric weight [gsm] | 138.2 | 129.6 | 138.8 | 128.9 | 139.2 | 139 | 147.1 | 137.7 | 139.6 | 140.3 |

EXAMPLE 5

Figure 3:
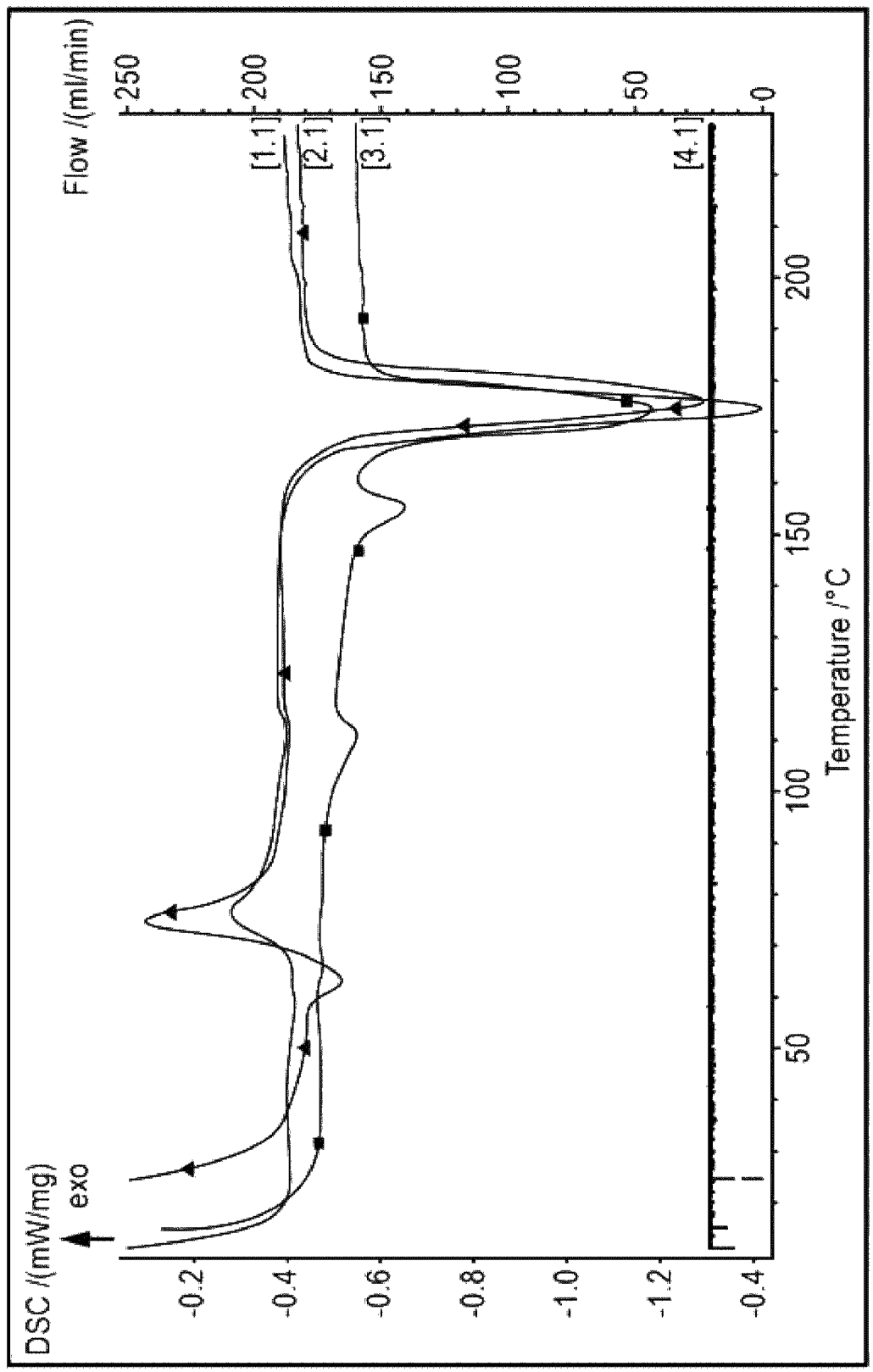
FIG. 3 shows the DSC spectra of samples X, Y and Z.

FIG. 3 shows DSC spectra of samples X (solid line), Y (delineated with squares) and Z (delineated with triangles). The DSC spectra show a marked glass transition temperature of about 60° C. for sample Z, with a similar, but less marked, glass transition for samples X and Y.

The DSC spectra also show a crystallisation peak at around 80° C. for sample Z, with a smaller crystallisation peak at the same temperature for fabric X and an even smaller crystallisation peak for fabric Y. This indicates that sample Y is more crystalline than sample X, which is more crystalline than sample Z.

The DSC spectra also show a melting transition at around 175° C. for each sample.

EXAMPLE 6

Samples were subject to a coffee brewing test by brewing 284 ml (10 oz) coffee in a Keurig 2.0 brewing machine. The machine employed a coffee pod comprising a filter prepared from single-layer fabrics produced in accordance with Example 2 above and having the properties in the table below.

After brewing, the coffee was filtered through a 1.0 μm filter and the residue ("sediments") were collected, dried for 24 hours at 23° C. in an atmosphere of about 50% relative humidity and weighed. The data illustrate that finer filament fabrics (smaller filament diameters), as produced by adjusting extrusion parameters as described above, give finer filtration and thereby lower sediments. The filtration of the fabric can be tailored to the coffee roaster's requirements.

| Sample ID | Extrusion Process | Bonding process | Basis weight Average (gsm) | cv (%) | Filament diameter Average (μm) | cv (%) | Sediments Average (g) | cv (%) |
|---|---|---|---|---|---|---|---|---|
| 579 | Spunbond | Hydroentangling - Bico | 136.4 | 9.8 | 29.9 μm | 13.4 | 0.276 | 39.5 |
| 953 | Spunbond | Hydroentangling - Bico | 151.0 | 9.7 | 28.3 μm | 12.9 | 0.132 | 19.4 |
| 198 | Spunbond | Hydroentangling - Mono | 137.5 | 5.9 | 22.0 μm | 10.6 | 0.083 | 18.2 |
| 16.80.42 | Spunbond | Calendering - Diamond roll | 148.1 | 2.0 | 21.9 μm | 9.5 | 0.047 | 3.6 |
| Sample-1 | Spunbond | Hydroentangling - Bico | 136.4 | 9.8 | 29.9 μm | 13.4 | 0.276 | 39.5 |
| Sample-2 | Spunbond | Hydroentangling - Bico | 151.0 | 9.7 | 28.3 μm | 12.9 | 0.132 | 19.4 |
| Sample-3 | Spunbond | Hydroentangling - Mono | 137.5 | 5.9 | 22.0 μm | 10.6 | 0.083 | 18.2 |
| Sample-4 | Spunbond | Calendering - Diamond roll | 148.1 | 2.0 | 21.9 μm | 9.5 | 0.047 | 3.6 |

Where "cv" is the coefficient of variation.

EXAMPLE 7

Fabrics comprising polylactic acid and polybutylenesuccinate were tested to determine resistance to shrinkage by placing in an oven heated at 165° C. for 1 minute or 10 seconds.

| Fabric | Bonding technique | % PBS | Cabin Pressure (Pa) | % crystallinity DSC | % shrinkage 165° C., 1 min | % shrinkage 165° C., 10 sec |
|---|---|---|---|---|---|---|
| 16.80.11 | Calendering | 6% | 2100 Pa | 33.4 | 48.2 | 45.3 |
| 570 | Hydro | 5% | 6000 Pa | 35.4 | 27.0 | 13.5 |
| 408 | Hydro | 3% | 6000 Pa | 38.0 | 27.8 | 19.0 |
| 953 | Hydro | 7% | 3500 Pa | 39.0 | 14.5 | 9.8 |

Shrinkage % is measured as areal shrinkage=[(initial fabric area−final fabric area)/initial fabric area]*100.

As can be seen, fabrics with higher crystallinity had improved properties with respect to shrink resistance.

EXAMPLE 8

Fabrics were prepared from bi-component filaments having a core and sheath configuration, as follows:

| Fabric | CP (Pa) | Composition core:sheath 6100D:6752D | Composition core:sheath 6100D:6100D | Auxiliary component (core/sheath) % PLA 6752D | Auxiliary component (core/sheath) % PBS | Process data thermoforming T (° C.) |
|---|---|---|---|---|---|---|
| 953 | 3500 | 80:20 | — | — | 7% | 152-155 |
| 284 | 3000 | — | 80:20 | 10% PLA 6752D | 7% | 138-147 |
| 285 | 2500 | — | 80:20 | 10% PLA 6752D | 7% | 138-147 |
| 286 | 3000 | — | 80:20 | 30% PLA 6752D | 7% | 138-147 |

As can be seen, filaments comprising two different polylactic acids (6100D and 6752D), wherein one of said polylactic acids (6752D) had a higher D-lactic acid content than the other component (6100D) and was present at a minor level, had improved thermoformability (were able to be thermoformed at lower temperatures).

Fabrics 284, 285 and 286 were produced with the typical spunbond extrusion technique set out above, adopting the processing parameters set out in the table below. Tests were run on a Reicofil 4 spun-bond line, STFI (Saxony Textile Institute), Chemnitz, Germany.

| trial no. | 284 | 285 | 286 |
|---|---|---|---|
| Resin C1: PLA 6100 D (core) | x | x | x |
| Resin C2: PLA 6752 D (sheath) | — | — | — |
| Resin C2: PLA 6100 D (sheath) | x | x | x |
| auxiliary component C1/C2: GS Pla 71PD [%] (core/sheath) | 7 | 7 | 7 |
| auxiliary component C1/C2: PLA 6752 D [%] (core/sheath) | 10 | 10 | 30 |
| throughput per hole [g/min * hole] | 1.26 | 1.26 | 1.26 |
| fabric weight (SET) [gsm] | 135 | 135 | 135 |
| throughput ratio C1:C2 | 80:20 | 80:20 | 80:20 |
| melt temperature die C1 [° C.] | 232 | 233 | 233 |
| melt temperature die C2 [° C.] | 231 | 231 | 231 |
| melt pressure die C1 [bar] | 83 | 82 | 85 |
| melt pressure die C2 [bar] | 62 | 62 | 63 |
| cabin pressure (SET) [Pa] | 3000 | 2500 | 3000 |
| process air volume Q1 [m³/h] | 1033 | 832 | 897 |
| process air volume Q2 [m³/h] | 5148 | 4783 | 5095 |
| process air temperature Q1 [° C.] | 25 | 25 | 25 |
| process air temperature Q2 [° C.] | 15 | 15 | 15 |
| SAS gap (exit) [mm] | 20 | 20 | 20 |
| gap pre-diffusor (exit) [mm] | 23 | 23 | 23 |
| filament fineness [den] | 4.12 | 4.89 | 4.29 |
| fabric weight [gsm] | 135.3 | 132.1 | 136.7 |

Those skilled in the art will recognise or be able to ascertain using no more than routine experimentation many equivalents to the specific embodiments described herein. The scope of the present embodiments described herein is not intended to be limited to the above description, but rather is as set forth in the appended claims. Those of ordinary skill in the art will appreciate that various changes and modifications to this description may be made without departing from the spirit or scope of the present invention, as defined in the following claims.

The invention claimed is:

1. A process for producing a thermoformable and bondable fabric, the fabric being biodegradable and/or compostable, the process comprising:
    extruding to form a plurality of bi-component filaments comprising one or two polymeric blends, the filaments collectively comprising the fabric, wherein the one or two polymeric blends collectively comprise a first polylactic acid and a second polylactic acid, wherein the first polylactic acid (a) comprises a greater proportion of D-configuration lactic acid units to L-configuration lactic acid units than in the second polylactic acid (b) and wherein the melting point of the first polylactic acid is lower than the melting point of the second polylactic acid.

2. The process according to claim 1, wherein said process is configured to yield a crystallinity in the plurality of filaments of about 30 to about 45%.

3. The process according to claim 1, wherein the one or two polymeric blends comprises 3 to about 12% polybutylene succinate, based on the total weight of the blend.

4. The process according to claim 1, wherein the one or two polymeric blends collectively comprise: polybutylenesuccinate, polybutylene succinate-co-adipate, polybutylene adipate-co-terephthalate, polyhydroxyalkanoate or polycaprolactone.

5. The process according to claim 1, wherein said filaments are exposed to an extrusion cabin pressure of about 1000 to about 5000 Pa.

6. The process according to claim 1, further comprising hydro-entanglement, wherein said hydro-entanglement comprises one or more water jets configured to project water at a pressure of about 7,000 to about 12,500 kPa.

7. The process according to claim 6, further comprising an infrared heating step downstream of said hydro-entanglement.

8. The process according to claim 1, wherein:
(a) the first polylactic acid comprises up to about 5% D-configured lactic acid units (based on the total number of lactic acid units in the polylactic acid); and/or
(b) the second polylactic acid comprises up to about 1% D-configured lactic acid units (based on the total number of lactic acid units in the polylactic acid).

9. The process according to claim 1, wherein the process employs one polymeric blend and wherein the blend comprises about 5 to about 15% of the first polylactic acid (a) and about 78 to about 88% of the second polylactic acid (b), based on the total weight of the blend.

10. The process according to claim 1, wherein there is one polymeric blend and both components in the bi-component filaments comprise the same polymeric blend.

11. The process according to claim 1, wherein there are two polymeric blends and each component in the bi-component filaments comprises a different polymeric blend.

12. The process according to claim 1, wherein one component in the bi-component filaments comprises a polymeric blend comprising said second polylactic acid (b) and wherein the other component in the bi-component filaments comprises polymeric blend comprising said first polylactic acid (a).

13. The process according to claim 1, wherein said process is configured to yield filaments having a core and sheath configuration, wherein the core comprises a polymeric blend comprising said second polylactic acid (b) and wherein the sheath comprises a polymeric blend comprising said first polylactic acid (a).

14. The process according to claim 10, wherein said process is configured to yield filaments having a core comprising about 60 to about 90% of a filament, on a weight basis.

15. The process according to claim 13, wherein the polymeric blend of the sheath has a lower melting point than the polymeric blend of the core.

16. The process according to claim 1, wherein said process employs a diffuser exit gap of between about 100 to 150 mm.

17. The process according to claim 1, wherein said process employs a line speed of about 15 to 50 metres per minute.

18. The process according to claim 1, wherein said process employs a presser roller configured to press the fabric with a pressure of between about 100 kPa and about 400 kPa.

19. The process according to claim 1, wherein said process employs a presser roller heated to a temperature of about 40 to about 80° C.

20. The process according to claim 1, wherein said process employs an air volume ratio of about 3 to about 7.5.

21. The process according to claim 1, wherein said process comprises spunbonding, comprising a die.

22. The process according to claim 1, comprising drawing the filaments; wherein said filaments are at a temperature at or above a glass transition temperature during said drawing.

23. The process according to claim 1, wherein a fluid is provided downstream of the die, said flow of gas being configured disperse filaments in all directions to increase planar isotropy of filament orientation.

24. The process according to claim 1, further comprising laying the filaments onto a surface.

25. The process according to claim 1, further comprising forming the fabric to a desired shape by thermoforming using a thermoforming mold, wherein the thermoforming mold is at a temperature of about 70° C. to 140° C.

26. The process according to claim 25, wherein the fabric is at a defined temperature above the glass transition temperature during said forming.

27. The process according to claim 26, wherein said defined temperature is achieved by directing a flow of gas at the fabric.

* * * * *